United States Patent
Duncker et al.

(10) Patent No.: US 9,665,654 B2
(45) Date of Patent: May 30, 2017

(54) SECURE CONNECTIONS IN AN INTERACTIVE ANALYTIC VISUALIZATION INFRASTRUCTURE

(71) Applicant: iCharts, Inc., Sunnyvale, CA (US)

(72) Inventors: Seymour Duncker, Los Altos, CA (US); Deepak Deolalikar, Milpitas, CA (US); Kevin Adams, San Jose, CA (US); Andrey Yruski, San Francisco, CA (US)

(73) Assignee: ICHARTS, INC., Sunnyvale, CA (US)

( * ) Notice: Subject to any disclaimer, the term of this patent is extended or adjusted under 35 U.S.C. 154(b) by 21 days.

(21) Appl. No.: 14/822,636

(22) Filed: Aug. 10, 2015

(65) Prior Publication Data
US 2016/0323249 A1 Nov. 3, 2016

Related U.S. Application Data

(60) Provisional application No. 62/155,273, filed on Apr. 30, 2015.

(51) Int. Cl.
*H04L 29/06* (2006.01)
*G06F 17/30* (2006.01)

(52) U.S. Cl.
CPC ........ *G06F 17/30876* (2013.01); *H04L 63/08* (2013.01); *H04L 63/102* (2013.01)

(58) Field of Classification Search
CPC ........... G06F 17/30876; H04L 63/0428; H04L 63/06; H04L 63/102
See application file for complete search history.

(56) References Cited

U.S. PATENT DOCUMENTS

| | | |
|---|---|---|
| 5,414,809 A | 5/1995 | Hogan et al. |
| 5,859,641 A | 1/1999 | Cave |
| 5,917,499 A | 6/1999 | Jancke et al. |
| 6,304,272 B1 | 10/2001 | Schanel et al. |
| 6,757,573 B1 | 6/2004 | Ledoux et al. |
| 7,080,070 B1 | 7/2006 | Gavarini |

(Continued)

OTHER PUBLICATIONS

U.S. Appl. No. 14/822,619, Seymour Duncker, Publishing Interactive Visualized Analytics, filed Aug. 10, 2015.

(Continued)

*Primary Examiner* — Yonas Bayou
(74) *Attorney, Agent, or Firm* — Polsinelli LLP

(57) ABSTRACT

A method and system is described securely capturing up-to-date data and presenting the up-to-date data in an analytic visualization. An update server receives a data request from a container that can display the analytic visualization. The update server generates a data processing instruction and transmits it to a data server. The update server then receives a processed data set from the data server, generates a visualization update based on the processed data set, and transmits the visualization update to the container. The container can then display the analytic visualization with up-to-date data from the data server. Because the data processing is performed at the data server, the remaining data on the data server is never moved through the network and remains secure. The update server can also receive from the container, and transmit to the data server, an identifier whose permissions limit data access from the data server.

20 Claims, 9 Drawing Sheets

(56) References Cited

U.S. PATENT DOCUMENTS

| | | |
|---|---|---|
| 7,113,190 B2 | 9/2006 | Heaton |
| 7,398,281 B2 | 7/2008 | Atchison et al. |
| 7,409,634 B2 | 8/2008 | Davis et al. |
| 7,512,875 B2 | 3/2009 | Davis |
| 7,584,415 B2 | 9/2009 | Cory et al. |
| 7,667,582 B1 | 2/2010 | Waldorf |
| 7,737,979 B2 | 6/2010 | Robertson et al. |
| 7,837,247 B2 | 11/2010 | Waldorf et al. |
| 7,840,937 B1 | 11/2010 | Chiluvuri |
| 7,961,188 B2 | 6/2011 | Tolle et al. |
| 8,190,987 B2 | 5/2012 | Campbell et al. |
| 8,255,791 B2 | 8/2012 | Koren |
| 8,271,892 B2 | 9/2012 | Duncker et al. |
| 8,520,000 B2 | 8/2013 | Duncker et al. |
| 8,661,358 B2 | 2/2014 | Duncker et al. |
| 8,667,394 B1 | 3/2014 | Spencer |
| 8,749,553 B1 | 6/2014 | Krasovsky et al. |
| 8,812,947 B1 | 8/2014 | Maoz et al. |
| 8,832,184 B1* | 9/2014 | Britto .................. G06F 9/542 709/203 |
| 9,037,964 B2 | 5/2015 | Appleyard et al. |
| 9,070,227 B2 | 6/2015 | Drucker et al. |
| 9,270,728 B2 | 2/2016 | Duncker |
| 2002/0063733 A1 | 5/2002 | Franke et al. |
| 2002/0156806 A1* | 10/2002 | Cox .................. G06F 17/24 715/202 |
| 2002/0169975 A1 | 11/2002 | Good |
| 2004/0119713 A1 | 6/2004 | Meyringer |
| 2004/0164983 A1 | 8/2004 | Khozai |
| 2004/0254844 A1 | 12/2004 | Torres |
| 2004/0264697 A1 | 12/2004 | Gavrilescu et al. |
| 2004/0265632 A1 | 12/2004 | Okinaka et al. |
| 2005/0068320 A1 | 3/2005 | Jaeger |
| 2005/0149538 A1 | 7/2005 | Singh et al. |
| 2005/0182941 A1 | 8/2005 | Della-Libera et al. |
| 2005/0232055 A1 | 10/2005 | Couckuyt et al. |
| 2005/0288899 A1 | 12/2005 | Winstead et al. |
| 2006/0004731 A1 | 1/2006 | Seibel et al. |
| 2006/0136535 A1 | 6/2006 | Boon |
| 2006/0136819 A1 | 6/2006 | Tolle et al. |
| 2007/0126736 A1 | 6/2007 | Tolle et al. |
| 2007/0203720 A1 | 8/2007 | Singh et al. |
| 2007/0203917 A1 | 8/2007 | Du et al. |
| 2007/0203945 A1 | 8/2007 | Louw |
| 2007/0245238 A1* | 10/2007 | Fugitt ................ G06F 3/0481 715/700 |
| 2008/0109740 A1 | 5/2008 | Prinsen et al. |
| 2008/0134059 A1 | 6/2008 | Kumar et al. |
| 2008/0183664 A1 | 7/2008 | Cancel et al. |
| 2008/0189254 A1 | 8/2008 | Cancel et al. |
| 2008/0189408 A1 | 8/2008 | Cancel et al. |
| 2008/0192056 A1 | 8/2008 | Robertson et al. |
| 2008/0195930 A1 | 8/2008 | Tolle |
| 2008/0307330 A1* | 12/2008 | Louch ................ G06F 3/0483 715/763 |
| 2008/0307334 A1* | 12/2008 | Chaudhri .............. G06F 3/048 715/764 |
| 2008/0316304 A1 | 12/2008 | Claus et al. |
| 2009/0018961 A1 | 1/2009 | Seven |
| 2009/0024405 A1 | 1/2009 | Brandes et al. |
| 2009/0079833 A1 | 3/2009 | Abraham et al. |
| 2009/0113091 A1 | 4/2009 | Miller et al. |
| 2009/0119399 A1 | 5/2009 | Hussain et al. |
| 2009/0199077 A1 | 8/2009 | Sar et al. |
| 2009/0265632 A1 | 10/2009 | Russ et al. |
| 2009/0307105 A1 | 12/2009 | Lemay et al. |
| 2010/0005008 A1 | 1/2010 | Duncker et al. |
| 2010/0005411 A1 | 1/2010 | Duncker et al. |
| 2010/0058250 A1 | 3/2010 | Stannard et al. |
| 2010/0095235 A1 | 4/2010 | Bennett et al. |
| 2010/0192166 A1 | 7/2010 | Kumar et al. |
| 2010/0214299 A1 | 8/2010 | Robertson et al. |
| 2010/0251128 A1* | 9/2010 | Cordasco .............. G06F 11/328 715/736 |
| 2010/0277481 A1 | 11/2010 | Cao et al. |
| 2010/0283606 A1 | 11/2010 | Tsypin et al. |
| 2010/0318611 A1 | 12/2010 | Curtin et al. |
| 2010/0332465 A1 | 12/2010 | Janssens et al. |
| 2011/0016131 A1 | 1/2011 | Fairchild et al. |
| 2011/0035692 A1 | 2/2011 | Sandone et al. |
| 2011/0041087 A1 | 2/2011 | Leveille et al. |
| 2012/0066088 A1 | 3/2012 | Murset |
| 2012/0144303 A1 | 6/2012 | Cricks et al. |
| 2012/0151378 A1 | 6/2012 | Parish |
| 2013/0111321 A1 | 5/2013 | Dorrell |
| 2013/0111368 A1* | 5/2013 | Laughlin ........... G06F 17/30994 715/760 |
| 2014/0040061 A1 | 2/2014 | Duncker et al. |
| 2014/0164008 A1 | 6/2014 | Gordon |
| 2014/0297569 A1* | 10/2014 | Clark .................. G06Q 10/00 706/11 |
| 2015/0019687 A1 | 1/2015 | Aaron et al. |
| 2015/0058755 A1 | 2/2015 | Duncker et al. |
| 2015/0095807 A1 | 4/2015 | Duncker et al. |
| 2015/0237085 A1 | 8/2015 | Duncker |
| 2015/0379059 A1* | 12/2015 | Schroetel .......... G06F 17/30368 707/690 |
| 2016/0112511 A1* | 4/2016 | Datsenko ............ H04L 67/1095 709/213 |
| 2016/0147880 A1 | 5/2016 | Scheibli et al. |
| 2016/0321224 A1 | 11/2016 | Duncker |
| 2016/0322021 A1 | 11/2016 | Duncker |

OTHER PUBLICATIONS

U.S. Appl. No. 14/823,799, Seymour Duncker, Creation of Interactive Composite Analytic Visualizations, filed Aug. 11, 2015.
U.S. Appl. No. 15/401,900, Seymour Duncker, Intelligent Container for Analytic Visualizations, filed Jan. 9, 2017.
U.S. Appl. No. 15/213,187, Seymour Duncker, Imperfect Market Data Enhancement and Correction, filed Jul. 18, 2016.
U.S. Appl. No. 15/173,354, Seymour Duncker, Semantic Layers for Secure Interactive Analytic Visualizations, filed Jun. 3, 2016.
"Adobe Flex," from Wikipedia, http://en.wikipedia.org/wiki/Adobe_Flex.
ChartFx 7.0 Feature, http://www.Softwarefx.com, download from wayback machine, http://archive.org, archived on Jan. 10, 2008, 6 pages.
U.S. Appl. No. 12/205,802 Office Action mailed Jan. 27, 2012.
U.S. Appl. No. 12/205,802 Final Office Action mailed Sep. 12, 2011.
U.S. Appl. No. 12/205,802 Office Action mailed Mar. 30, 2011.
U.S. Appl. No. 13/593,347 Office Action mailed Mar. 22, 2013.
U.S. Appl. No. 12/372,696 Final Office Action mailed Oct. 3, 2012.
U.S. Appl. No. 12/372,696 Office Action mailed Dec. 14, 2012.
U.S. Appl. No. 12/372,696 Final Office Action mailed Aug. 16, 2011.
U.S. Appl. No. 12/372,696 Office Action mailed Apr. 1, 2011.
U.S. Appl. No. 14/823,799 Office Action mailed Apr. 7, 2017.

* cited by examiner

SECURE CONNECTIONS IN AN INTERACTIVE ANALYTIC VISUALIZATION INFRASTRUCTURE

CROSS-REFERENCE TO RELATED APPLICATIONS

The present application claims the priority benefit of U.S. provisional application No. 62/155,273 filed Apr. 30, 2015 and entitled "Secure Connections in an Interactive Analytic Visualization Infrastructure," the disclosure of which is hereby incorporated by reference.

BACKGROUND

1. Field of the Invention

The present invention generally relates to analytic visualizations. More specifically, the present invention relates to the secure transfer of data for embedded analytic visualizations.

2. Description of the Related Art

With the continued proliferation of computing devices and the ubiquitous increase in Internet connectivity, dealing with vast quantities of data has become a norm in business and consumer markets. Viewing and manipulating such data while the data is still arranged in spreadsheets, tables, databases, and other data structures can often be slow, difficult, unwieldy, and in some cases, entirely unmanageable. Therefore, it is often helpful to arrange such data into analytic visualizations, such as charts and graphs. Typically, a user of spreadsheet software such as Microsoft Excel might manually import data through a data structure conversion process to generate a chart or graph from the data. The user may then export the chart or graph as a static image into a document or web page.

One problem with manually exporting analytic visualizations through spreadsheet software as static images is that there is no easy way to update, filter, interact with, or manipulate those visualizations if they are embedded into a web portal or similar medium where a viewer might expect data to be updated and interactive. In order to update such a static-image analytic visualization, someone must enter updated data into a spreadsheet, generate a new analytic visualization based on the updated data, export the updated analytic visualization as a new image, and embed the image into the web portal. Similarly, if a viewer would like to filter data in the visualization (e.g., view sales data for the United States when viewing an analytic visualization showing worldwide sales data), the data owner would need to generate, export, and embed a separate analytic visualization with the filtered data.

A further problem is that charts with any form of update mechanism are not designed to access data in a secure manner. Owners of data must often blindly trust third parties with their data to allow it any semblance of interactivity. Owners transfer large amounts of potentially sensitive data to third-party servers for processing, thereby giving rise to the possibility that the third party will sell or leak the data. Any sensitive data on such third party servers is further vulnerable to malicious hackers or snooping governmental entities if the network connections are compromised via a man-in-the-middle attack or if the third party servers themselves are compromised.

Similar problems exist with respect to personalization based on viewer permissions. Presently available systems display charts with the same level of detail and same viewable categories of data when displaying to a high-ranking company executive as to a lower-level company employee or to a member of the public. Nor do presently available systems allow for viewer interactivity with charts that update based on viewer actions and viewer inputs from the viewer of the chart. Accessing data from multiple sources is also a challenge, especially with respect to data security.

There is, therefore, a need in the art for improved analytic visualization systems that maintain security while allowing for different levels of permissions, interactivity, and integration of data from multiple data sources.

SUMMARY OF THE PRESENTLY CLAIMED INVENTION

One exemplary method for providing analytic visualization data includes various method operations. The method may include receiving a data request from a container, wherein execution of the container by a portal processor displays an analytic visualization. The method may include receiving an identifier from the container. The method may include generating a data processing instruction based on the data request. The method may include transmitting the data processing instruction and the identifier to a data server containing a data source, the data processing instruction requesting that the data server locally select a subset of the data source and locally produce a processed data set including the subset, wherein the subset includes data from the data source based on a permission setting associated with the identifier. The method may include receiving the processed data set from the data server without receiving any additional data from the data set, where the additional data is not in the subset. The method may include generating a visualization update including the processed data set. The method also includes transmitting the visualization update to the container.

One exemplary system for providing analytic visualization data includes various system elements. The system may include a data server plugin within a data server memory of a data server. The system may also include an update server communicatively coupled to the data server, the update server having an update server memory and an update server processor. Execution of instructions stored in the update server memory by the update server processor may perform a set of operations. The operations may include receiving a data request from a container, wherein execution of the container by a portal processor displays an analytic visualization. The operations may include receiving an identifier from the container. The operations may include generating a data processing instruction based on the data request. The operations may include transmitting the data processing instruction and the identifier to a data server containing a data source, the data processing instruction requesting that the data server locally select a subset of the data source and locally produce a processed data set including the subset, wherein the subset includes data from the data source based on a permission setting associated with the identifier. The operations may include receiving the processed data set from the data server without receiving any additional data from the data source, where the additional data is not in the subset. The operations may include generating a visualization update including the processed data set. The operations may also include transmitting the visualization update to the container.

One exemplary stored program for providing analytic visualization data may be stored on a non-transitory computer-readable storage medium. The stored program may be executable by a processor to perform an exemplary method for providing analytic visualization data. The method may include receiving a data request from a container, wherein execution of the container by a portal processor displays an analytic visualization. The method may include receiving an identifier from the container. The method may include generating a data processing instruction based on the data request. The method may include transmitting the data processing instruction and the identifier to a data server containing a data source, the data processing instruction requesting that the data server locally select a subset of the data source and locally produce a processed data set including the subset, wherein the subset includes data from the data source based on a permission setting associated with the identifier. The method may include receiving the processed data set from the data server without receiving any additional data from the data set, where the additional data is not in the subset. The method may include generating a visualization update including the processed data set. The method also includes transmitting the visualization update to the container.

DETAILED DESCRIPTION

Embodiments of the present invention concern systems and methods of securely capturing and presenting up-to-date data in an analytic visualization. An update server receives a data request from a container that can display the analytic visualization. The update server generates a data processing instruction and transmits it to a data server. The update server then receives a processed data set from the data server, generates a visualization update based on the processed data set, and transmits the visualization update to the container. The container can then display the analytic visualization with up-to-date data from the data server. Because the data processing is performed at the data server, the remaining data on the data server is never moved through the network and remains secure. The update server can also receive from the container, and transmit to the data server, an identifier whose permissions limit data access from the data server.

Figure 1:
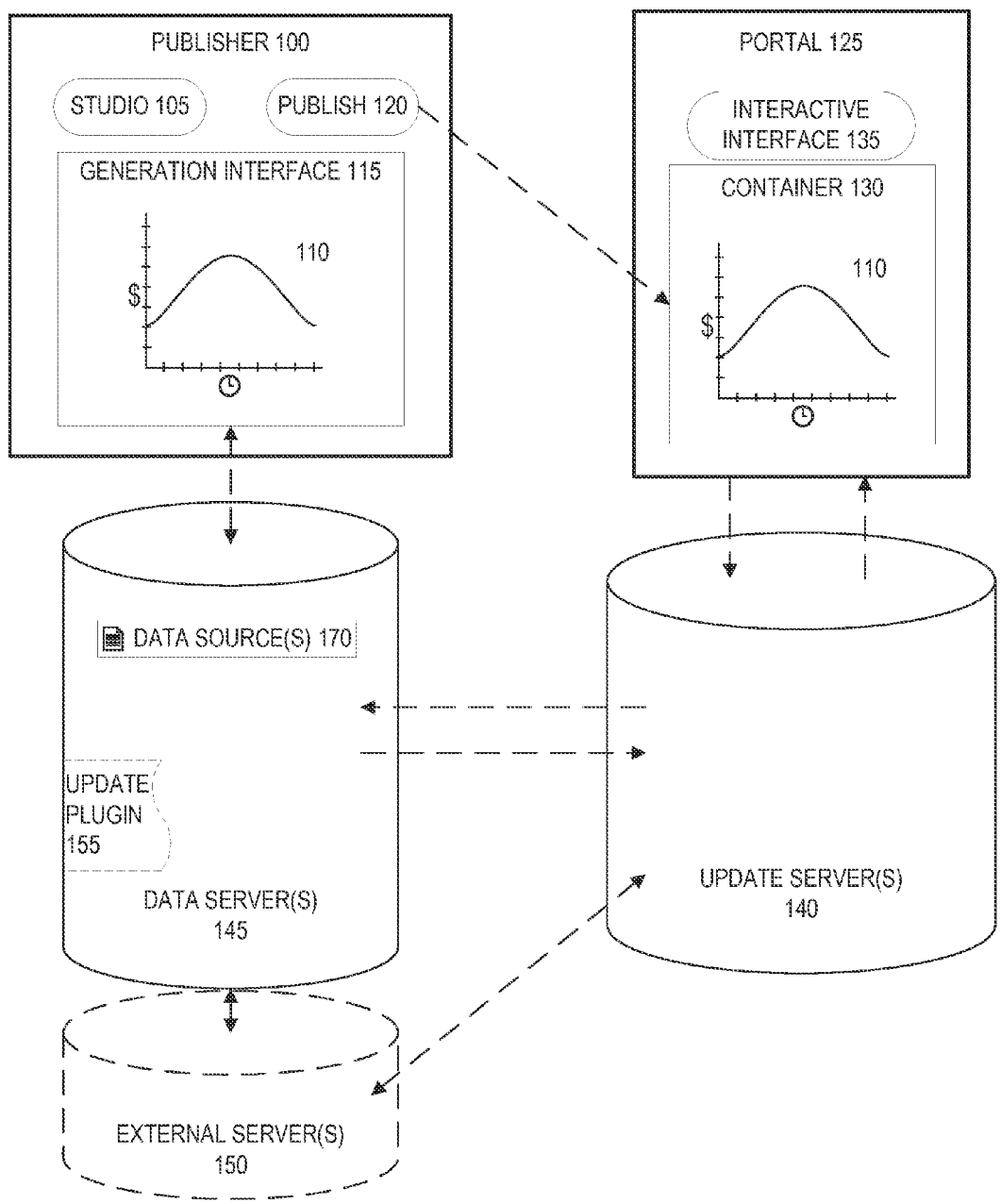
FIG. 1 illustrates an exemplary analytic visualization ecosystem.

FIG. 1 illustrates an exemplary analytic visualization ecosystem. The analytic visualization ecosystem of FIG. 1 includes publisher 100, portal 125 with an embedded container 130 displaying an analytic visualization 110, update server(s) 140, data server(s) 145, and external server(s) 150.

The analytic visualization ecosystem may include network connections (not shown) that communicatively connect two or more of the update server(s) 140, the data server(s) 145, the external server(s) 150, the portal 125 and container 130, and the publisher 100. These network connections may include wired network connections, such as fiber optic network connections, Ethernet network connections, coaxial data cable network connections, or dial-up modem network connections. Network connections may also include wireless network connections, such as Wi-Fi network connections, WiMAX network connections, global system for mobile communications (GSM) network connections, code division multiple access (CDMA) network connections, general packet radio service (GPRS) network connections, enhanced data GSM environment (EDGE) network connections, third generation (3G) cellular network connections, fourth generation (4G) cellular network connections, Long Term Evolution (LTE) cellular network connections, other 802.x network connections, Bluetooth network connections (which may utilize another network-connected device as a proxy for Internet access), radio frequency network connections, satellite-based network connections, or other types of network connections.

For example, the update server(s) 140 may be connected to the data server(s) 145 and/or the external server(s) 150 through a network connection, the data server(s) 145 may be connected to the external server(s) 150 through a network connection.

The portal 125 may be hosted on one or more portal server(s) (not shown) that may be may be connected to the update server(s) 140 through a network connection. The container 130 may be hosted on one or more container server(s) (not shown) that may be connected to the update server(s) 140 through a network connection. In some embodiments, the portal server(s) and container server(s) may be the same computer systems.

The publisher 100 may be hosted on a publisher server (not shown) that may be connected to the data server(s) 145 and/or the external server(s) 150 through a network connection. The publisher 100 may also be connected to the portal server(s) (not shown) and/or the container server(s) (not shown) through a network connection.

These may be direct network connections or other servers and/or network devices may be located in between each endpoint of the above-described network connections. Other network connections may also exist that are not described above. Each of these network connections described may be a private network connection (e.g., a network connection within a local area network or wireless local area network or municipal area network) or a network connection going through the public Internet.

Each of the update server(s) 140 may be any type of computing device, including a smartphone, a tablet, a laptop computer, a desktop computer, a rack-mounted server, an entertainment/gaming console, a network device, or a virtual machine. Each of the update server(s) 140 may include a variety of components, which may be physical, virtual (e.g., simulated functionality in a virtual machine), or some combination thereof. These components may include, for example, a processor, a memory, a display, a keyboard, a mouse, a touchscreen, a power source, a memory or storage interface, a communications interface able to use one of the previously described network connections, and a variety of other hardware components and software elements.

Update server(s) 140 may be a single computing device, or may alternately be one or more of a collection of computing devices connected in a network, or may be one or more of a collection of computing devices distributed throughout the Internet. Update server(s) 140 may include one or more computers systems run privately and/or may include one or more computer systems run by a third-party entity as a service to be used by one or more individuals or groups.

Each of the data server(s) 145 may be any type of computing device as described in relation to the update server(s) 140. Each of the data server(s) 145 may include a variety of physical and/or virtual components as described in relation to the update server(s) 140.

The data server(s) 145 may be a single computing device, or may be one or more of a collection of computing devices connected in a network (e.g., as in FIG. 7), or may be one or more of a collection of computing devices distributed throughout the Internet.

The data server(s) 145 may store one or more data source(s) 170. Each of the data source(s) 170 may include any data structure that can hold data about one or more entities, such as a database, a table, a list, a matrix, an array, an arraylist, a tree, a hash, a flat file, an image, a queue, a heap, a memory, a stack, a set of registers, or a similar data structure. Each of the data source(s) 170 may be associated with one or more Customer Relationship Management (CRM) systems, Information Management System (IMS), or other data management systems or services. For example, each of the data source(s) 170 may be associated with a Netsuite CRM system, a Salesforce CRM system, an SAP CRM System, an Oracle CRM system, a Microsoft Dynamics CRM system, a Zoho CRM system, an IBM IMS system, a Microsoft Sharepoint-based system, or another type of system for managing data. Each of the data source(s) 170 may also be associated with an ATOM feed, RSS feed, XML feed, or other type of updating data feed. In situations where multiple data sources 170 exist, each data source may be associated with a different type of CRM, IMS, or other data management system or service, or with a different type of data feed.

Each data source of the data source(s) 170 may be stored on the same data server (of the data server(s) 145) as another data source. Alternately, different data sources of the data source(s) 170 may be stored on different data servers of the data server(s) 145. The data source(s) 170 may also be stored at least partly at the external server(s) 150.

The data source(s) 170 may include one or more types of data, such as data, such as financial data, sports data, geographic data, time data, sales data, market research data, price data, currency exchange data, stock market data, film data, television data, video game data, device usage data, entertainment data, download data, viewership data, upload data, network data, network speed data, network coverage data, biological data, health data, hospital data, medical data, age data, height data, weight data, transportation data, traffic data, opinion data, voting data, political data, rating data, immigration data, emigration data, wealth data, poverty data, other types of data, or some combination thereof.

Data server(s) 145 may also be associated with various security measures, and data stored at data server(s) 145 may be encrypted. In embodiments where there is more than one data server(s) 145, data transmitted among the data server(s) 145 may be secured by keeping at least a subset of such data transmissions within a private/local network. Transmitted data may also be secured by using secure protocols such as Secure Sockets Layer (SSL) or Transport Layer Security (TLS).

Each of the data server(s) 145, or a subset of the data server(s) 145, may also store and/or execute an update plugin 155. The update plugin 155 may be a piece of software stored in a data server memory 600 of the data server(s) 145 and executed by the processor(s) of the data server(s) 145. The update plugin 155 may be transferred to the data server(s) 145 and/or installed on the data server(s) 145 prior to any analytic visualization operations based on data from the data server(s) 145 (e.g., prior to the exemplary publishing operations of FIG. 3 and/or update operations of FIG. 4). In some embodiments, no update plugin 155 is necessary for the operations related to the present invention. The update plugin 155 may include an application program interface (API) that can be used by the update server(s) 140. Alternately, the update server(s) 140 may include an application program interface (API) of their own that can be used by the update plugin 155 and/or the data server(s) 145. The update plugin 155 and/or the data server(s) 145 may also facilitate data communications between the data server(s) 145 and the external server(s) 150.

In some embodiments, the update plugin 155 may be stored and/or executed, not at the data server(s) 145, but at another hardware device (not shown) coupled to one or more of the data server(s) 145 such that the hardware device has access and/or control over files stored at the data server(s) 145. Such a device may, but need not, store one or more of the data source(s) 170.

Each of the external server(s) 150 may be any type of computing device as described in relation to the update server(s) 140. Each of the data server(s) 145 may include a variety of physical and/or virtual components as described in relation to the update server(s) 140.

External server(s) 150 may be a single computing device, or may be one or more of a collection of computing devices connected in a network, or may be one or more of a collection of computing devices distributed throughout the Internet.

External server(s) 150 may in some embodiments include one or more systems associated with large-scale data storage, data structures, and/or data queries. For example, external sever 150 may include one or more systems associated with a Google BigQuery system, a Google CloudSQL system, a Google BigTable system, an Amazon RedShift system, an Amazon DynamoDB system, a Microsoft Azure SQL system, an Amazon EC2-based system, an Google Compute-based system, a mapreduce-based system, a hadoop-based system, an Apache HBase-based system, a MongoDB-based system, or another type of system.

The portal 125 may be any type of web page or web-based interface. In some embodiments, the portal 125 may be a public web page (or other web entity) accessible through the Internet. In embodiments where the portal 125 is a public web page (or other web entity) accessible through the Internet, the portal 125 may be completely public (e.g. accessible to the public through the public Internet) or semi-public (e.g., accessible through the public Internet but only to certain individuals, such as individuals who have provided an appropriate identifier such as a login, a password, a PIN number, a security code/token such as RSA SecurID, a biometric scan, a digital key, or a digital certificate).

The portal 125 may alternately be a private network entity such that access to the portal is limited to a predetermined one or more individuals. For example, the portal 125 may be stored on an "intranet" that is only accessible to users connected to a particular network. The network may be a privately owned wired network or a wireless network, and may include a local area network (LAN), a wireless local area network (WLAN), a wired municipal area network (MAN), or a wide area network (WAN). In embodiments where the portal 125 is a private network entity, the portal 125 may be public within that private network (e.g., accessible to anyone with access to the private network) or may be accessible only through further privacy precautions (e.g., accessible only to certain private network users, such as private network users who have provided an appropriate identifier of one of the aforementioned identifier types). Examples of private network portals 125 may be intranet pages within the private network of a company (e.g., hosting information for employees), executive-only intranet pages of a company (e.g., accessible only through further privacy precautions), school campus-wide intranet pages, intranet pages related to an Internet Service Provider (ISP) for a geographical area, and similar types of pages.

The portal 125 may be associated with a CRM, IMS, or other data management system or service as described in relation to the data source(s) 170. For example the portal 125 may be a Netsuite Portlet or a SalesForce Visualforce Page.

The portal 125 and/or container 130 and/or analytic visualization 110 may be associated with a software application to be executed. For example, the portal 125 and/or container 130 and/or analytic visualization 110 may trigger the viewer device to open at least part of the portal 125 and/or container 130 and/or analytic visualization 110 in a separate software application, such as a video player software or a document reader/editor software, or a mobile device software "app."

The portal 125 may be hosted at a portal server (not shown) with a portal memory (not shown) and a portal processor (not shown). The portal server (not shown) may any type of computing device as described in relation to the update server(s) 140. The portal server may include a variety of physical and/or virtual components as described in relation to the update server(s) 140.

The portal server (not pictured) may be a single computing device, or may be one or more of a collection of computing devices connected in a network, or may be one or more of a collection of computing devices distributed throughout the Internet.

The portal 125 may be displayed at a viewer device (not shown) with a viewer memory (not shown) and a viewer processor (not shown). The viewer device (not shown) may any type of computing device as described in relation to the update server(s) 140. The viewer device may include a variety of physical and/or virtual components as described in relation to the update server(s) 140.

The portal 125 may include an embedded container 130. The container 130 may include an analytic visualization 110. The container 130 may be at least partly expressed as a string of text (or "code") that may be inserted into a web page, such as a HyperText Markup Language (HTML) page or an Extensible Markup Language (XML) page, in order to embed the container 130 into the HTML page. For example, the container 130 can include code corresponding to an "iframe" markup element, code corresponding to PHP Hypertext Preprocessor (PHP) elements, code corresponding to JavaScript elements, code corresponding to Cascading Style Sheet (CSS) elements, code corresponding to HyperText Markup Language Version 5 (HTML5) elements, code corresponding to HyperText Markup Language (HTML) elements, code corresponding to Extensible Markup Language (XML) elements, code corresponding to Extensible Hypertext Markup Language (XHTML) elements, code corresponding to embedding an Adobe/MacroMedia Flash file, code corresponding to embedding a Microsoft Silverlight file, code corresponding to embedding a Java file, code corresponding to embedding a Microsoft ActiveX control or element, code corresponding to embedding an executable file, code corresponding to triggering a software application (e.g., a personal computer software suite such as an analytic visualization software or a video player software or a document reader/editor software, or a mobile device software "app") stored on the viewer device, or other similar code capable of embedding or triggering interactive elements within a web page. The container could include a multimedia container file such as an Adobe/MacroMedia Flash file, a Microsoft Silverlight file, a Java applet file, a Microsoft ActiveX control file, or an executable file.

The container 130 may be associated with an interactive interface 135. The interactive interface 135 may be included within the container 130 or may be outside of the container 130 but tied to the container 130 such that any inputs received by the interactive interface 135 are received by the container 130. The interactive interface 135 may include a graphical user interface (GUI) with one or more GUI elements such as icons, labels, push buttons, radio buttons, checkboxes, combination boxes or combo boxes, pop-up menus, pull-down menus, menu bars, tool bars, text entries, text areas, canvas panels, sliders, handles, or other GUI elements. The interactive interface 135 may also receive inputs from one or more hardware input devices, which may include a keyboard, a mouse, a touchscreen, a physical button, a physical switch, a physical lever, a physical slider, a physical knob, or a similar physical interface element. These GUI elements of the interactive interface 135 may be subdivided into sub-interfaces.

The interactive interface 135 may receive inputs from a viewer of the portal 125 related to the analytic visualization 110 displayed in the container 130. For example, a viewer may use the interactive interface 135 in order to request a filtering of the data in the analytic visualization 110 (e.g., to display sales data from only the United States if the analytic visualization 110 initially showed sales data worldwide). A viewer may use the interactive interface 135 in order to request a change of the data in the analytic visualization 110 (e.g., to display sales data from France if the analytic visualization 110 initially showed sales data from the United States). A viewer may use the interactive interface 135 in order to request a change in a display format of the analytic visualization 110 (e.g., to display sales data formatted as a pie chart if the analytic visualization 110 initially showed sales data formatted as a line graph). A viewer may use the interactive interface 135 in order to request two data sets (or two subsets of the same dataset) to be compared either by displaying them side-by-side or by performing a mathematical operation (e.g., difference, sum, ratio, average) and displaying the result (e.g., to display difference data between sales data in the United States and sales data in France).

The analytic visualization 110 may be any type of visualization useful in analyzing data. For example, the analytic visualization 110 may be line graph, a bar chart, a pie chart, an area graph, a scatter plot, a volume graph, a surface graph, a doughnut chart, a bubble chart, a box plot, a radar chart, a sparkline chart, a cone chart, a pyramid chart, a stock chart, a histogram, a Gantt chart, a waterfall chart, a binary chart (e.g., win/loss), a pictograph, an organizational chart, a flow chart, a map, a gauge, a table, or another type of chart, graph, or indicator. The analytic visualization 110 may include data from the data source(s) 170, which may be stored at the data server(s) 145 and/or the external server(s) 150.

The analytic visualization 110 may also include metadata 510 (see FIG. 5A), which describes format, category, or dimension information related to the analytic visualization 110. For example, metadata 510 and may include graph axis information (e.g., the fact that the X axis of a graph displays time, cost, vote amounts, or some other category of data), format information (e.g., the fact that an analytic visualization is to be formatted as a line graph as opposed to a bar chart, and the fact that the line is to be three-dimensional and blue as opposed to two-dimensional and red). The metadata 510 may also include information about where a particular data source of the data source(s) 170 is stored (e.g., the fact that an analytic visualization is to use data from data source A stored on data server X).

A publisher 100 may be used to generate, edit, and eventually publish the analytic visualization 110. The publisher 100 may include a studio interface 105, a publishing interface 120, and a generation interface 115. The studio interface 105 can include various GUI controls such as the ones described in relation to the interactive interface 135, and can be used to control the data to be used in the analytic visualization 110 to be published (e.g., data source A stored on data server X), the format of the analytic visualization 110 to be published (e.g., a line graph as opposed to a bar chart, with a three-dimensional blue line), and any software applications that are to be triggered in order to help display the analytic visualization 110 to a viewer (e.g., to open a particular part of the analytic visualization 110 in a video player application). The generation interface 115 may connect to the data source(s) 170 at the data server(s) 145 and/or external sever(s) 150 (e.g., through the update plugin 155) in order to provide data to preview the analytic visualization 110 to the user who is working to edit and publish the analytic visualization 110. In some situations, the user may not have permission to view all of the data from the data source(s) 170, in which case the data may be filtered before it is sent to the generation interface 115 based on permission settings associated with the user's identifier 205, similarly to the filtering/processing operations described in relation to FIG. 6. The user may then use the publishing interface 120 to generate a container 130 and control how the container 130 is generated, which may include generating container files, container embed codes, and container software triggers. The publisher 100 may in some cases alternately generate a portal 125 with the container 130 already embedded, or part of a portal 125 with the container 130 already embedded.

In an alternate embodiment (not shown), the generation interface 115 may instead transmit the publisher data request 240 (and identifier 205 if applicable) to the update server(s) 140, where the publisher data request 240 is then treated like a data request 200 (see e.g. FIG. 2, FIG. 4, and FIG. 6) with the exception that the resulting visualization update 220 is instead treated as the publisher data response 245 and is sent back to the generation interface 115 instead of to the container 130.

At least part of the container 130 may be hosted at a container server (not shown) with a container memory (not shown) and a container processor (not shown). The container server (not shown) may any type of computing device as described in relation to the update server(s) 140. The container server may include a variety of physical and/or virtual components as described in relation to the update server(s) 140.

The container server (not pictured) may be a single computing device, or may be one or more of a collection of computing devices connected in a network, or may be one or more of a collection of computing devices distributed throughout the Internet. One or more devices of the container server(s) (not pictured) may in some cases be the same device(s) as one or more devices of the portal server(s) (not pictured).

The publisher 100 may be executed by a publisher device (not shown) with a publisher memory (not shown) and a publisher processor (not shown). The publisher device (not shown) may any type of computing device as described in relation to the update server(s) 140. Each of the data server(s) 145 may include a variety of physical and/or virtual components as described in relation to the update server(s) 140.

Figure 2:
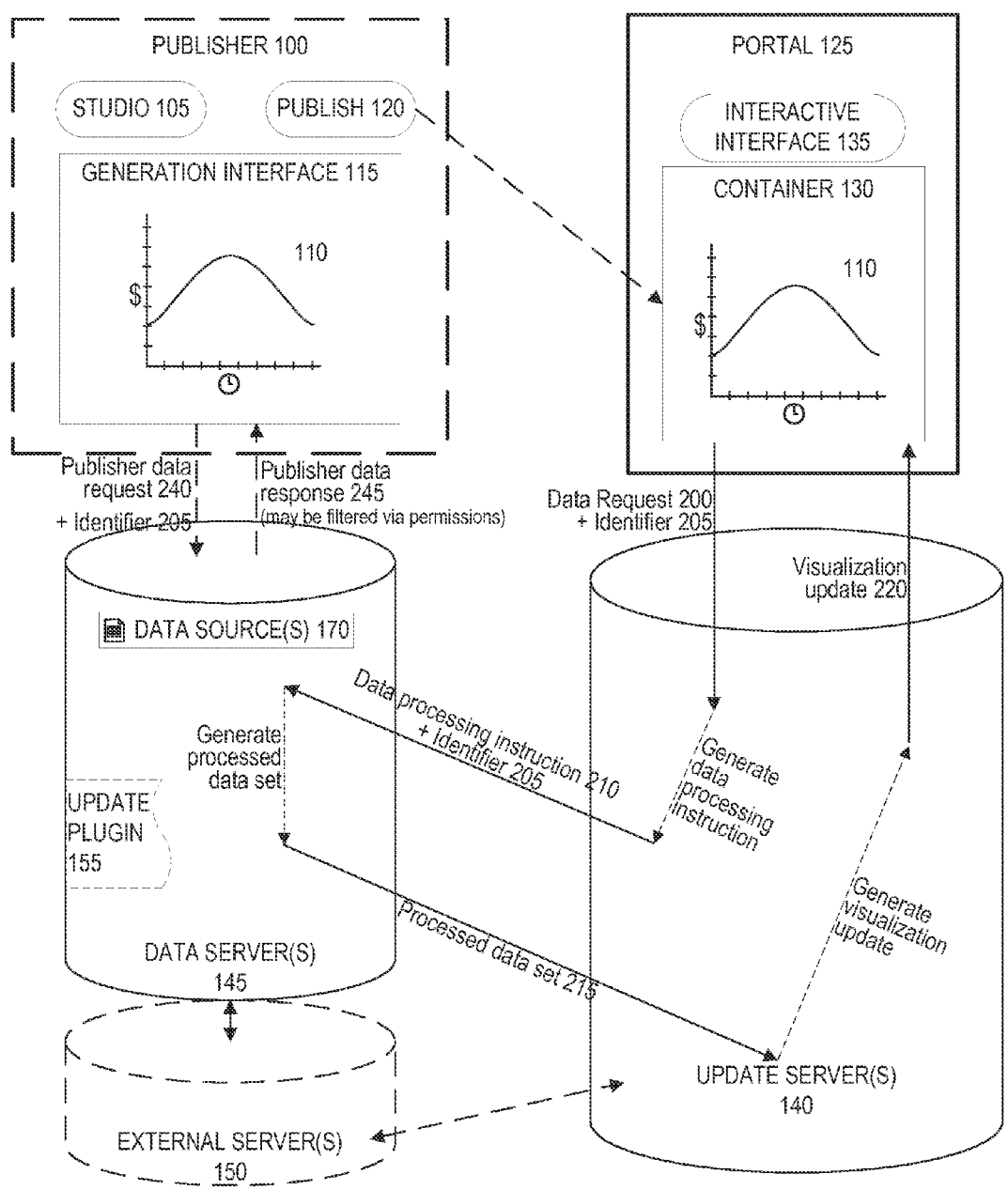
FIG. 2 illustrates data transfers performed to update an analytic visualization within a container embedded in a portal.

FIG. 2 illustrates data transfers performed to update an analytic visualization within a container embedded in a portal. The data transfers of FIG. 2 illustrate update operations as well as optional publishing operations.

The optional publishing operations may begin with a publisher 100. A user of the publisher 100 may use the various GUI elements of the studio interface 105 to generate an analytic visualization 100 to be previewed at the generation interface 115. The generation interface 115 may connect to the data source(s) 170 (e.g., through the update plugin 155) in order to provide data for the analytic visualization 110 preview. This is illustrated as a publisher data request 240 from the generation interface 115 (e.g., at the publisher server) to the data server(s) 145, and a publisher data response 245 from the data server(s) 145 to the generation interface 115 (e.g., at the publisher server). In some situations, an identifier 205 (associated with the user using the publisher 100) may be sent alongside the publisher data request 240. The publisher data request 240 and identifier 205 could be sent together as part of a "bundle" of files. The bundle of files could be an archive file (including but not limited to file formats such as ZIP, RAR, 7Z, 7ZX, GZIP, TAR, BZIP2, CAB, LZH), a collection of multiple files sent in series (i.e., one after the other), a collection of multiple files sent in parallel (i.e., at least part of the transfer is performed simultaneously), or some combination thereof. The permission settings associated with the identifier 205 may be used to limit the data included in the publisher data response 245 in a similar manner to the one described regarding the filtering of the data source(s) 170 before generating the processed data set 215 as describe in FIG. 6. In this way, if a low-level employee is tasked with generating the analytic visualization 110 using the publisher 100, this does not mean that the low-level employee is automatically allowed to see data previewed through the generation interface 115 that the low-level employee would not be allowed to otherwise see (e.g., if the low-level employee tried to access this data through the analytic visualization 110 once it was already published).

Within the optional publishing operations, the identifier 205 may be gathered by the publisher 100 from the user automatically (e.g., by collecting a browser cookie when the user begins using the publisher 100), manually (e.g., by requiring an input by the viewer of a string, by requiring transmission of a file, or by requiring transmission of photographic/biometric data through the studio interface 105), or some combination thereof. The particular identifier 205 associated with a particular user of the publisher 100 may be associated with a set of permissions that dictate what data from the data source(s) 170 the particular user is allowed to preview via the publisher data response 240 in the same way that permissions associated with an identifier 205 of a viewer control dictate what data may be viewed by the viewer as described in FIG. 6.

The optional publishing operations may continue with the user then using the publishing interface 120 to generate a container 130 and control how the container 130 is generated, which may include generating container files, container embed codes, and container software triggers. The publisher 100 may in some cases alternately generate a portal 125 with the container 130 already embedded, or part of a portal 125 with the container 130 already embedded.

The update operations begin once the container 130 has been embedded in the portal 125, meaning that the analytic visualization 110 is "published" to viewers of the portal 125. In particular, once a viewer accesses the portal 125, and because it is embedded within the portal 125, the container 130, the container 130 (e.g., through the container server or portal server or viewer device) transmits a data request 200 to the update server(s) 140. In some cases, the container 130 also transmits an identifier 205 to the update server(s) 140. The data request 210 and identifier 205 could be sent together as part of a "bundle" of files. The bundle of files could be an archive file, a collection of multiple files sent in series, a collection of multiple files sent in parallel, or some combination thereof.

In some embodiments, the identifier 205 may be missing from this data transfer from the container 130 to the update server(s) 140, such as when the analytic visualization 110 is intended to show the same data regardless of who is viewing it (though an identifier 205 may still be sent in such a scenario for other purposes such as identifying who has viewed the analytic visualization 110). In such embodiments, the data transfer 200 is sent alone.

The data request 200 may be sent from the container 130 to the update server(s) 140 in one of several scenarios.

First, the data request 200 may be sent when a viewer first views the portal 125 using the viewer device (not displayed), in order to initially populate the analytic visualization 110 with data from the data source(s) 170. In some embodiments, this is not necessary, as the container 130 may already include some data gathered from the data source(s) 170 by the publisher 100 prior to publishing (e.g., using the publisher data request 240 and publisher data response 245). In other embodiments, it is may be necessary, particularly if an identifier 205 is sent alongside the data request 200, and if permission settings associated with the identifier 205 may affect what a viewer is allowed to see in the analytic visualization 110.

Second, the data request 200 may be sent in order to update the analytic visualization 110 when data is manipulated (e.g., new data is added or existing data is edited/deleted) at the data source(s) 170. Updates may be triggered automatically every time data is manipulated (e.g., new data is added or existing data is edited or deleted) at the data source(s) 170. Updates may alternately be triggered automatically every time relevant data (i.e., data that can be displayed by the analytic visualization 110 that is currently being displayed by the container 130) is manipulated at the data source(s) 170, while manipulation of irrelevant data (i.e., data that cannot be displayed by the analytic visualization 110 that is currently being displayed by the container 130) does not trigger an automatic update. Updates may alternately be triggered automatically when periodic polling (e.g., every 10 minutes) determines that data (or relevant data) has been manipulated at the data source(s) 170. Updates may alternately be triggered automatically periodically (e.g., every 10 minutes) regardless of whether or not data (or relevant data) has been manipulated at the data source(s) 170. Updates can also be triggered manually by the viewer (e.g., using the interactive interface 135 and/or a browser-based or operating-system-based interface).

Third, the data request 200 may be sent in response to an input from a viewer of the portal 125 (e.g., through the interactive interface 135). For example, a viewer may be able to trigger an input (e.g., through the interactive interface 135) in order to request a filtering of the data in the analytic visualization 110 as described in relation to the interactive interface 135 as depicted in FIG. 1. Some of these exemplary inputs may, in some cases, trigger a data request 200 in order to gather additional data or different data from the data source(s) 170. Some of these exemplary inputs may trigger actions that do not trigger a data request 200, such as when no additional data or different data is required from the data source(s) 170.

A viewer of the portal 125 may be also able to trigger an input (e.g., through the interactive interface 135) in order to request a change in a display format of the analytic visualization 110 (e.g., to display sales data formatted as a pie chart if the analytic visualization 110 initially showed sales data formatted as a line graph). Some of these exemplary inputs may, in some cases, trigger a data request 200 in order to gather additional data or different data from the data source(s) 170 (e.g., if the new format is more detailed and thus requires more data than the previous format). Some of these exemplary inputs may trigger actions that do not trigger a data request 200, such as when no additional data or different data is required from the data source(s) 170 (e.g., if the new format is equally detailed or less detailed and thus does not require more data than the previous format).

There may also be other scenarios in which a data request 200 is sent from the container 130 to the update server(s) 140. For example, a data request 200 might be sent in response to a communication from another computing device (not pictured).

The identifier 205 may include one or more of a variety of types of identity-related files or data types. The identifier 205 may be or include, for example, an OAuth token, a browser cookie, a symmetric key, a public key, a temporary security token, a certificate signed by a certificate authority, a Lightweight Directory Access Protocol (LDAP) token, a Remote Authentication Dial In User Service (RADIUS) token, a Security Assertion Markup Language (SAML) token, an Active Directory token, an Extensible Markup Language (XML) based token, or a data set including at least one user-specific descriptor. The identifier 205 may include a variety of data types, and may thus include data types such, such as a name, a username, a user account, a telephone number, an email address, a password, a PIN number, a social security number, a driver's license number, an identification number, a biometric dataset, a user-specific code, a user-specific barcode, a user-specific icon, an image, an identifying trait, or another user-specific descriptor. The identifier 205 may be gathered from the viewer automatically (e.g., by collecting a browser cookie when the viewer visits the portal 125), manually (e.g., by requiring an input by the viewer of a string, by requiring transmission of a file, or by requiring transmission of photographic/biometric data), or some combination thereof. The identifier 205 may be collected by the portal 125 and/or the container 130 and/or the interactive interface 135.

The particular identifier 205 associated with a particular viewer may be associated with a set of permissions that dictate what data from the data source(s) 170 of the data server(s) 145 and/or external server(s) 150 the particular viewer is allowed to access. For example, if the data source(s) 170 hold sales data for a company, and the analytic visualization 110 is a sales visualization, different members of the company might have different permissions allowing them to view different data in the analytic visualization 110. For instance, a high-ranking company executive of the company may be granted access to all of the worldwide sales data in the data source(s) 170, while a regional manager might be granted access to only the regional sales data from the data source(s) 170 associated with that regional manager's managed region (e.g., California, Virginia, New York, Washington D.C.). Low-level employees may further be granted limited access to sales data from the data source(s) 170 through the analytic visualization 110 (e.g., only yearly sales sums rather than detailed reports), and members of the public may be completely barred from access to any sales data through the analytic visualization 110. All of this may be controlled by permission settings associated with the identifier 205. The permission settings are generally obtained by the portal server and/or container server and sent to the update server(s) 140 and eventually the data server(s) 145. In some embodiments, the permission settings may also be accessible at the publisher device and/or the external server(s) 150.

The permission settings associated with an identifier 205 may be sent alongside the identifier 205 (or one after the other). For example, the permission settings could be part of the identifier 205 (e.g., part of a file sent representing the identifier 205 or part of a string sent representing the identifier 205). The permission settings and identifier 205 could be sent together as part of a "bundle" of files. The bundle of files could be an archive file, a collection of multiple files sent in series, a collection of multiple files sent in parallel, or some combination thereof.

The permission settings may alternately be stored separately from the identifier in a location where they may be accessed by the data server(s) 145 and/or the external server(s) 155 and/or the update server(s) 140 (e.g., through a network connection). For example, the permission settings may be stored by separate security server(s) (not pictured) that may be queried by one or more of the data server(s) 145 and/or the external server(s) 155 and/or the update server(s) 140 and/or the portal server and/or the container server and/or the viewer device. The security server(s) may alternately be the same computing device(s) as one or more of the data server(s) 145, the external server(s) 155, the update server(s) 140, portal server (not pictured), container server (not pictured), and/or the publisher device (not pictured). The security server(s) may be run by a trusted third party such as a certificate authority.

Each of the security server(s) (not pictured) may be any type of computing device as described in relation to the update server(s) 140. The security server(s) may include a variety of physical and/or virtual components as described in relation to the update server(s) 140. The security server(s) (not pictured) may be a single computing device, or may be one or more of a collection of computing devices connected in a network, or may be one or more of a collection of computing devices distributed throughout the Internet.

Once the update server(s) 140 receives the data request 200 (and, in some cases, also the identifier 205), the update server(s) 140 may conduct operations in order to eventually generate the visualization update 220. In particular, the update server(s) 140 may generate a data processing instruction 210 based on the data request 200 that includes instructions for the data server(s) 145 to follow in order to generate a processed data set 215.

The data processing instruction 210 is then sent to the data server(s) 145. The identifier 205 may also be sent to the data server(s) 145. The data processing instruction 210 and identifier 205 could be sent together as part of a "bundle" of files. The bundle of files could be an archive file, a collection of multiple files sent in series, a collection of multiple files sent in parallel, or some combination thereof.

The update server(s) 140 may, in some situations, send the data processing instruction 210 and/or the identifier 205 to the external server(s) 150 as an intermediary, so that the external server(s) 150 may then forward the data processing instruction 210 and/or the identifier 205 onward to the data server(s) 145.

Once the data server(s) 145 receives the data processing instruction 210 and/or the identifier 205, the data server(s) 145 may access the data source(s) 170 and generate a processed data set 215. Generating the processed data set 215 may be based on the data request 200 and the analytic visualization metadata 510, and the identifier 205. The processing operations executed by the data server(s) 145 in order to generate the processed data set 215 are described in more detail in FIG. 6. These processing operations may be guided or facilitated by the update plugin 155. During these processing operations, the data server(s) 145 may in some cases obtain more data from the external server(s) 150 as needed.

The processed data set 215 includes at least a subset of data from the data source(s) 170 of the data server(s) 145 and/or external server(s) 150. This subset includes the data that is requested by the analytic visualization 110, that the permission settings associated with the identifier 205 allow to be shown, and that should be obtained given the type/format of the analytic visualization. The fact that the data server(s) 145, not the update server(s) 140, performs the operations for generating the processed data set 215 gives the present invention a security benefit, since sensitive data from the data source(s) 170 that is not within the processed data set 215 does not need to travel over the public Internet.

Once the data server(s) 145 have generated the processed data set 215, the data server(s) 145 transmit the processed data set 215 to the update server(s) 140. The update server(s) 145 then generate a visualization update 220 based on the processed data set 215. The update server(s) 140 then transmit the visualization update to the container 130.

The visualization update 220 may take one of at least two forms, depending on where the analytic visualization 110 is to be generated.

The first form of the visualization update 220 may include the processed data set 215 and metadata 510 stored at the update server(s) 140. Using this form of visualization update 220, the container 130 receives the visualization update 220 and uses the processed data set 215 and metadata 510 to generate an updated version of the analytic visualization 110. This first form of the visualization update 220 may be useful to put less stress on the update server(s) 140. This first form of the visualization update 220 is further described in FIG. 5A.

The second form of the visualization update 220 may include data corresponding to an updated version of the analytic visualization 110. Update server(s) 140 that use this form of visualization update 220 use the processed data set 215 and metadata 510 to generate the data corresponding to an updated version of the analytic visualization 110. Once the container 130 receives the visualization update 220, it simply displays the updated version of the analytic visualization 110 based on the data corresponding to the updated version of the analytic visualization 110 that was already generated by the update server(s) 140. This second form of the visualization update 220 may be useful when multiple data sources are involved or when generating an updated version of the analytic visualization 110 is particularly resource-intensive. This second form of the visualization update 220 is further described in FIG. 5B.

Once the container 130 receives the visualization update 220, it may generate and/or display the updated version of the analytic visualization 110 as described above.

Figure 3:
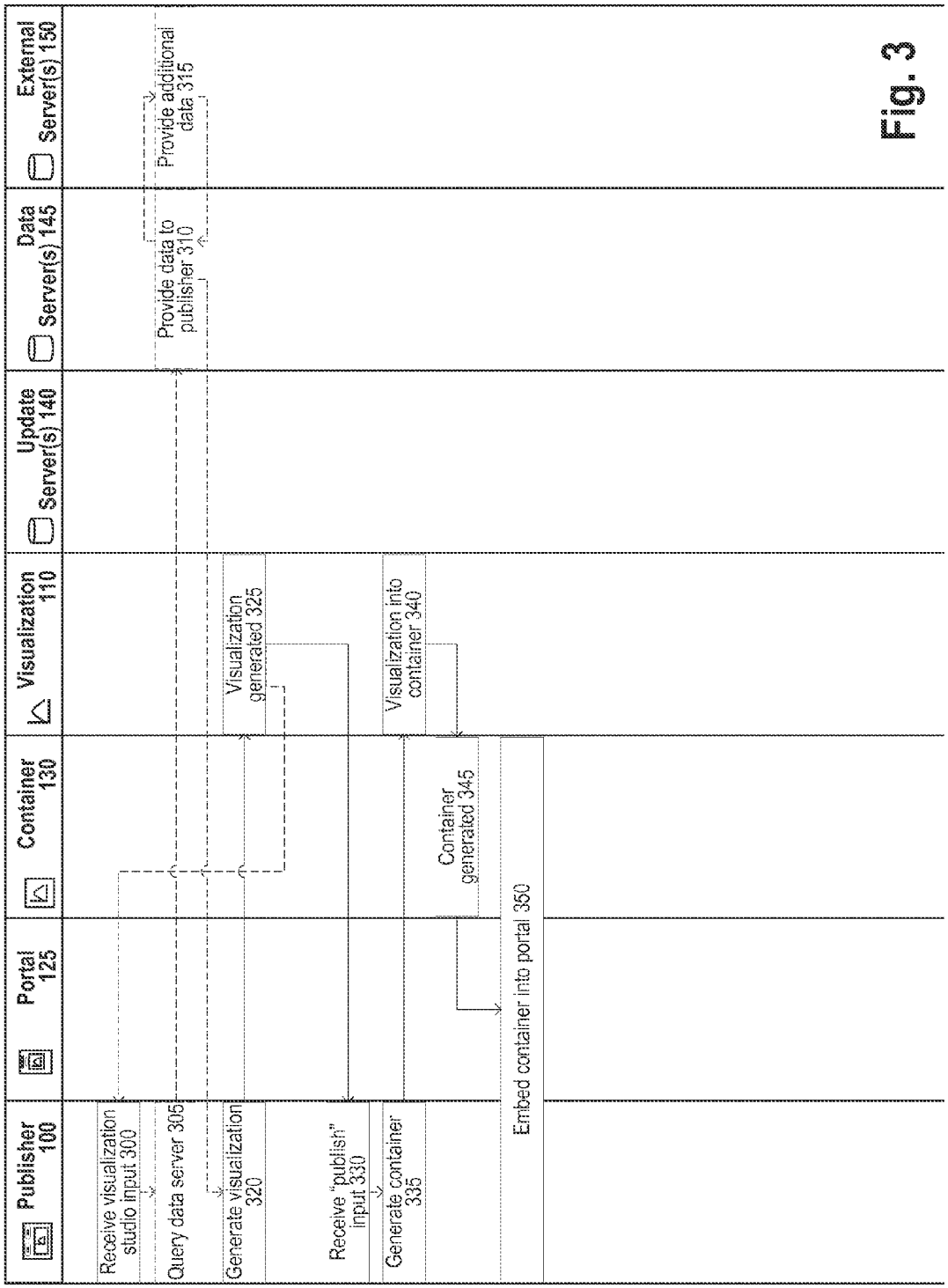
FIG. 3 is a lane-based flow diagram illustrating the publishing of an exemplary analytic visualization within a container embedded in a portal.

FIG. 3 is a lane-based flow diagram illustrating the publishing of an exemplary analytic visualization within a container embedded in a portal. The publishing operations are optional in relation to the updating operations described in FIG. 4, and in some cases different publication operations can be used.

The exemplary publication operations depicted in FIG. 3 begin with receipt of inputs from the studio interface 105 and/or generation interface 115 of the publisher 100 (step 300). These input may correspond to a user's interactions with the studio interface 105 and/or generation interface 115.

Optionally, the publisher 100 may query the data server(s) 145 and/or the external server(s) 150 through the publisher data request 240 (step 305). The data server(s) 145 may then gather a subset of the data from the data source(s) 170 as described in relation to FIG. 2 and send this subset back to the publisher 100 in the form of the publisher data response 245 (step 310). Accessing the data sources(s) 170 for the publisher data response 245 may optionally involve accessing additional data at the external server(s) 150 (step 315). In some embodiments, the publisher data response 245 may be filtered at the data server(s) 145 based on the publisher user's permissions as described in relation to FIG. 2.

The publisher 100 may then generate a visualization 110 (step 320, step 325). The previously discussed steps may be repeated if the user makes further edits to the visualization (e.g., by receiving visualization studio input from the studio interface 105 and/or generation interface 115 at step 300).

Once a visualization is generated (see step 320 and step 325), the publisher may receive a "publish" input from the publish interface 120 of the publisher 100 (step 330). The "publish" input may indicate that the user wishes to "publish" the analytic visualization 110 by generating a container 130 for the analytic visualization 110 and embedding it into a portal 125. The "publish" input could in some cases be an automatic input instead of a manual input triggered by a user—for example, the publisher 100 could be programmed to automatically generate and publish a new analytic visualization every time a new category of data, or a new data source, is added to data source(s) 170.

Once the publisher receives the "publish" input (see step 330), the publisher 100 generates a container 130 (step 335). The container 130 is generated so that the analytic visualization 110 generated at the publisher 110 can be displayed by the container 130 (step 340), thus completing generation of the container 130 (step 345).

Once the container 130 is generated (see step 345), the container 130 may be embedded into the portal 125, either automatically via actions taken by the publisher 100, or manually via actions taken by a user. For example, the publisher 100 may output code corresponding to the generated container 130, which a user may copy and paste into the markup code (e.g., HTML) of a web page that is being used as the portal 125. Alternately, the publisher 100 may automatically embed the container 130 into the portal 125 (see step 350) through by being granted some degree of access to one or more files stored at the portal server (not pictured), and/or container server (not pictured).

Figure 4:
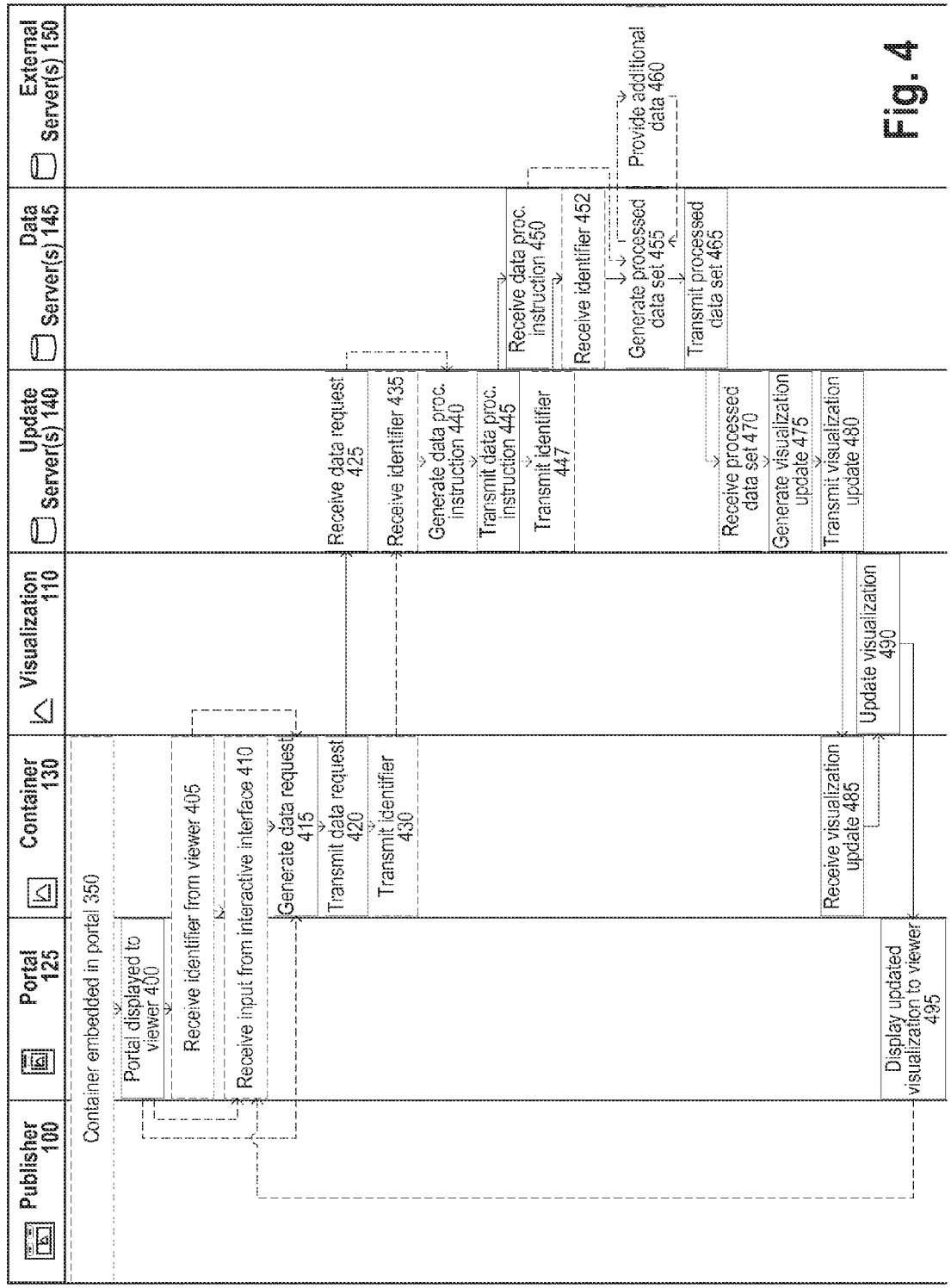
FIG. 4 is a lane-based flow diagram illustrating the updating of an analytic visualization within a container embedded in a portal.

FIG. 4 is a lane-based flow diagram illustrating the updating of an analytic visualization within a container embedded in a portal.

The update operations may begin with the portal 125 being displayed to a viewer who is accessing the portal 125 using a viewing device (step 400). The accessing of the portal 125 by the viewer may optionally take place immediately after the container 130 is first embedded in the portal 125 (step 350 of FIG. 4; see also step 350 of FIG. 3), though this is not a requirement.

The portal 125 and/or container 130 may, in some situations, receive an identifier 205 from the viewer (step 405), either through automatic collection of the identifier 205 by the portal 125 and/or the container 130 (e.g., such as if the identifier 205 is a browser cookie) or through manual transmission of an identifier 205 (e.g., such as if the identifier 205 is a password or biometric dataset) to the portal 125 and/or the container 130.

The portal 125 and/or container 130 may, in some situations, receive an input from interactive interface 135 (step 410). Using the interactive interface 135, a viewer may trigger one of a number of data requests relating to viewer-controlled manipulation of the analytic visualization 110. For example, a viewer may be able to trigger an input (e.g., through the interactive interface 135) in order to request a filtering of the data in the analytic visualization 110 as described in relation to the interactive interface 135 as depicted in FIG. 1.

The next step of the update operations, regardless of whether the identifier 205 was received (see step 405) and/or the input from the interactive interface 135 was received (see step 410), is for the container 130 to generate a data request 200 (step 415). The data request 200 may include a request to update, change, and/or add to the visualization data in the analytic visualization 110 using data from the data source(s) 170. The data request 200 may also include a request to change the format of the analytic visualization 110. The data request 200 may also include a request to populate the analytic visualization 110 with data from the data source(s) 170 for the first time.

The container 130 and/or portal 125 may then transmit the data request 200 to the update server(s) 140 (step 420), after which the update server(s) 140 may receive the data request 200 (step 425). If the portal 125 and/or container 130 received an identifier 205 from the viewer at step 405, the container 130 may also transmit the identifier 205 to the update server(s) 140 (step 430), after which the update server(s) 140 may receive the identifier 205 (step 435).

Once the update server(s) 140 have received the data request 200 (see step 425), and in some embodiments, also the identifier 205 (see step 435), the update server(s) 140 may generate a data processing instruction 210 (step 440). The data processing instruction 210 may include any instructions necessary/useful for the data server(s) 145 to obtain the desired visualization data requested by the data request 200 from the data source(s) 170. The data processing instruction 210 may, for example, identify requested data sets, categories, or sources, manipulate which data is used, identify filters that determine what data should not be included, or other similar information.

Once the update server(s) 140 generates the data processing instruction 210 (see step 440), the update server(s) 140 may transmit the data processing instruction 210 to the data server(s) 145 (step 445), after which the data server(s) 145 may receive the data processing instruction 210 (step 450). If the portal 125 and/or container 130 received an identifier 205 from the viewer at step 405, the update server(s) 140 may also transmit the identifier 205 to the data server(s) 145 (step 447), after which the update server(s) 140 may receive the identifier 205 (step 452).

Once the data server(s) 145 receives the data processing instruction 210 (see step 450), and, in some cases, the identifier 205 (see step 452), the data server(s) 145 may access the data source(s) 170 and generate a processed data set 215 (step 455). Generating the processed data set 215 may be based on the data request 200, the analytic visualization metadata 510 (which stores information including the format of the analytic visualization 110 and axes and categories of data included within), and the identifier 205. The processing operations executed by the data server(s) 145 in order to generate the processed data set 215 are described in more detail in FIG. 6. These processing operations may be guided or facilitated by the update plugin 155. During these processing operations, the data server(s) 145 may in some cases obtain more data from the external server(s) 150 as needed (step 460).

The processed data set 215 includes at least a subset of data from the data source(s) 170 of the data server(s) 145 and/or external server(s) 150. This subset includes the data that is requested by the analytic visualization 110, that the permission settings associated with the identifier 205 allow to be shown, and that should be obtained given the type/format of the analytic visualization. The fact that the data server(s) 145, not the update server(s) 140, performs the operations for generating the processed data set 215 gives the present invention a security benefit, since sensitive data from the data source(s) 170 that is not within the processed data set 215 does not need to travel over the public Internet.

Once the data server(s) 145 generates the processed data set 215 (see step 455), the data server(s) 145 may transmit the processed data set 215 to the update server(s) 140 (step 465), after which the update server(s) 140 may receive the processed data set 215 (step 470). The update server(s) 140 may then generate a visualization update 220 (step 475).

Figure 5A:
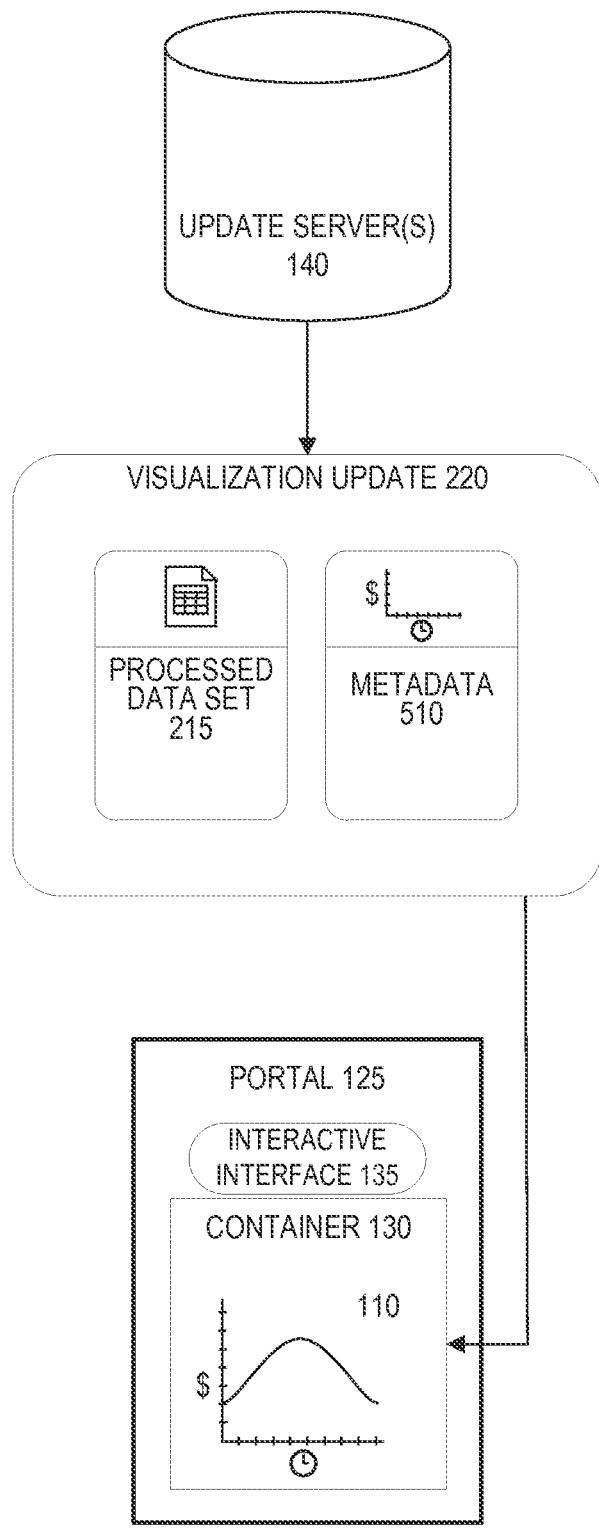
FIG. 5A illustrates a first form of exemplary visualization update as transferred from an update server to a container embedded within a portal.
Figure 5B:
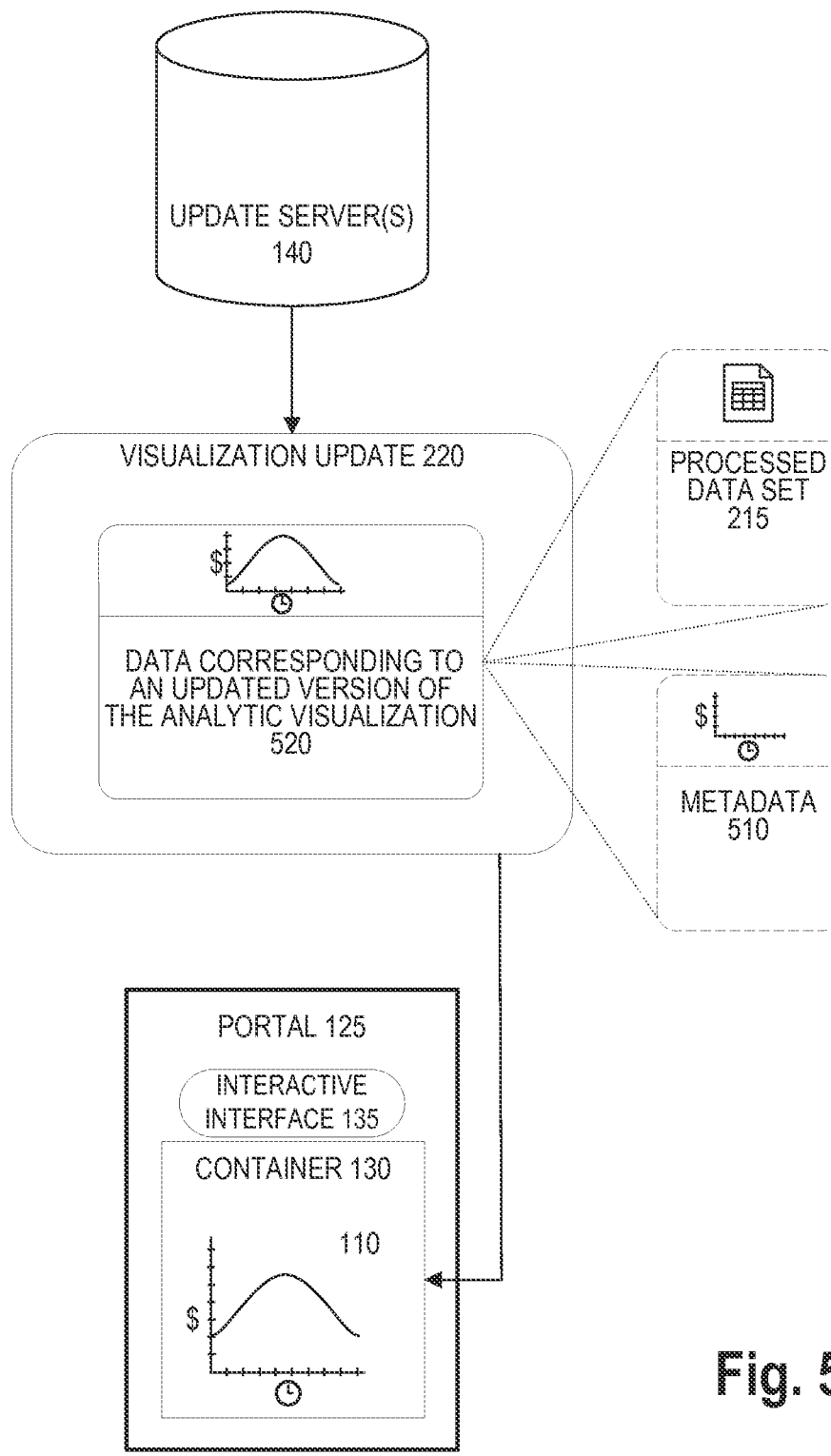
FIG. 5B illustrates a second form of exemplary visualization update as transferred from an update server to a container embedded within a portal.

The visualization update 220 may take one of at least two forms, depending on where the analytic visualization 110 is to be generated. These two forms are illustrated and described in FIG. 5A and FIG. 5B and the related descriptions, as well as the description of the visualization update 220 in FIG. 2. Once the update server(s) 145 generates the visualization update 220, the update server(s) 145 may then transmit the visualization update 220 to the container 130 (step 480), after which the container 130 may receive the visualization update 220 (step 485). The container 130 may then update the analytic visualization 110 based on the visualization update 220 (step 490). If the visualization update 220 is of the first type as depicted in FIG. 5A (including the processed data set 215 and metadata 510), then updating the analytic visualization 110 based on the visualization update 220 may involve generating the updated version of the analytic visualization 110 based on the processed data set 215 and metadata 510. If the visualization update 220 is of the second type as depicted in FIG. 5B (including data corresponding to an updated version of the analytic visualization 520), then updating the analytic visualization 110 based on the visualization update 220 may involve simply displaying the updated version of the analytic visualization 110 whose corresponding data is already included in the visualization update 220.

Once an updated version of the analytic visualization 110 has been generated and the analytic visualization 110 has been updated (see step 490), the updated version of the analytic visualization 110 may be displayed to the viewer (step 495). The viewer may then view and interact with the analytic visualization 110 (e.g., through the interactive interface 135). If the viewer's interaction with the interactive interface 135 requires additional and/or different data to be loaded from the data server(s) 145 and/or external server(s) 150, then the update operations may repeat starting from step 410.

The operations described herein as being performed by the container 130 be executed by the viewer device, the container server, the portal server, or some combination thereof.

FIG. 5A illustrates a first form of exemplary visualization update as transferred from an update server to a container embedded within a portal.

The first form of the visualization update 220 may include the processed data set 215 and metadata 510 stored at the update server(s) 140. Using this form of visualization update 220, the container 130 receives the visualization update 220 and uses the processed data set 215 and metadata 510 to generate an updated version of the analytic visualization 110. This first form of the visualization update 220 may be useful to put less stress on the update server(s) 140, since the update server(s) 145 do not need to generate the updated version of the analytic visualization 110.

FIG. 5B illustrates a second form of exemplary visualization update as transferred from an update server to a container embedded within a portal.

The second form of the visualization update 220 may include data corresponding to an updated version of the analytic visualization 110. Update server(s) 140 that use this form of visualization update 220 may use the processed data set 215 and metadata 510 to generate, at the update server(s) 140, data corresponding to an updated version of the analytic visualization 110. Once the container 130 receives the visualization update 220, it simply displays the updated version of the analytic visualization 110 based on the data corresponding to the updated version of the analytic visualization 110 that was already generated by the update server(s) 140. This second form of the visualization update 220 may be useful when multiple data sources are involved (e.g., resulting in multiple processed data sets 220) or when generating an updated version of the analytic visualization 110 is particularly resource-intensive (which may be useful when the device executing the container 130, such as the viewer device, is not powerful).

Figure 6:
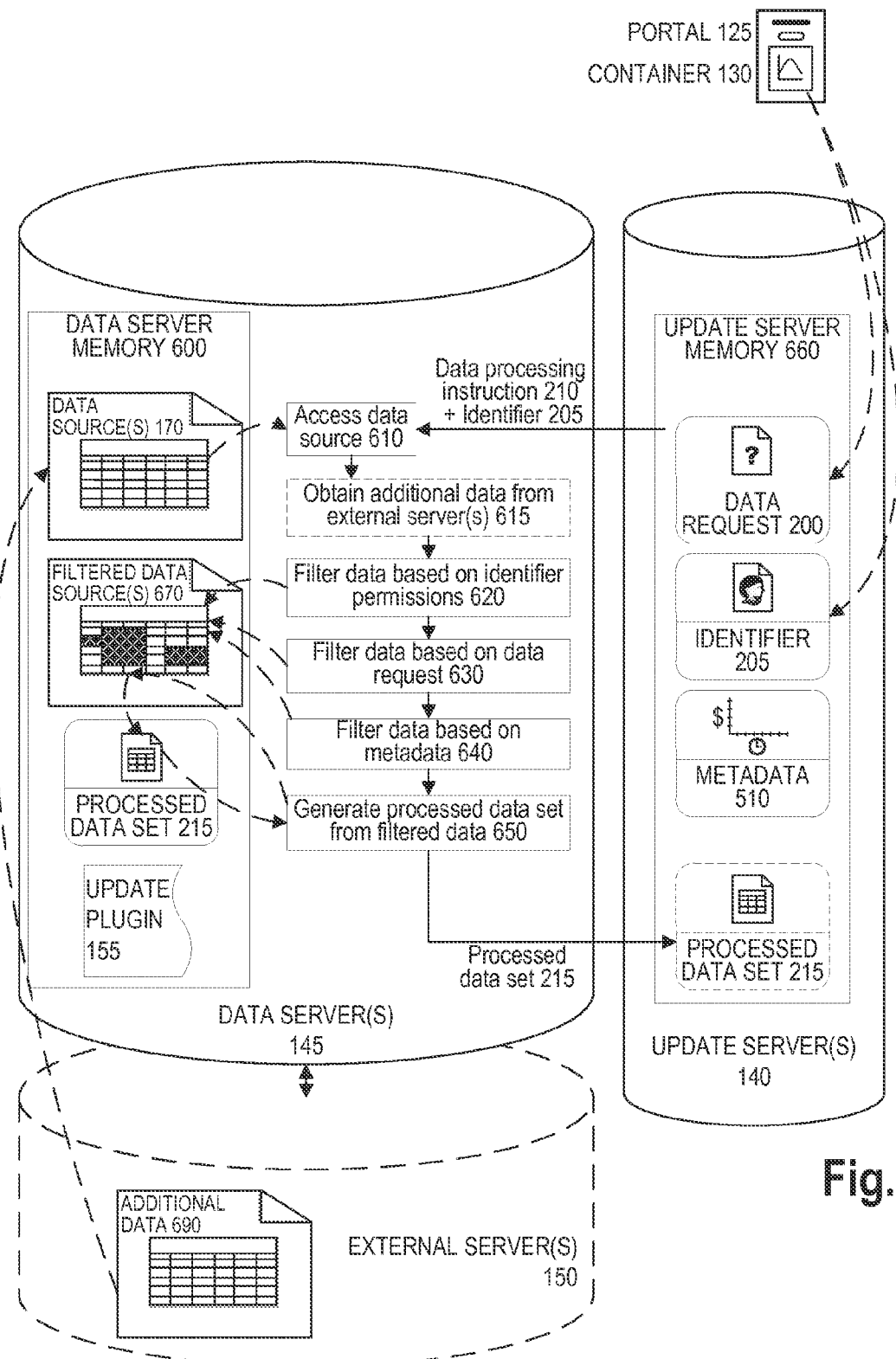
FIG. 6 is a flow diagram illustrating data processing operations performed by a data server to generate a processed data set.

FIG. 6 is a flow diagram illustrating exemplary data processing operations performed by an exemplary data server in order to generate a processed data set, the flow diagram also showing exemplary data stored in a data server memory of the exemplary data server and exemplary data stored in an update server memory of an exemplary update server. The exemplary data processing operations of FIG. 6 may be at least partially performed by the update plugin 155 stored in the data server memory 600 of the data server(s) 145.

The exemplary data processing operations may begin with accessing a data source(s) 170 within the data server memory 600 of the data server(s) 145 (step 610). Optionally, the exemplary data processing operations may also include obtaining additional data 690 stored at the external server(s) 150.

The exemplary data processing operations may then begin filtering data from the data source(s) 170 as well as from the additional data 690 if applicable (see step 620, step 630, and step 640). These filtering steps may be performed in any order. Once the filtering steps are performed, the processed data set 215 is generated (step 650) such that any data that has not been filtered out is included in the processed data set 215.

The filtering steps (see step 620, step 630, and step 640) may be performed a number of ways. For example, the filtering steps may involve generating a copy of the data source(s) 170, as well as from the additional data 690 if applicable, and removing data at each filtering step until the data for the processed data set is all that remains. Alternately, the filtering steps may involve generating a new copy for every filtering step. Alternately, the filtering steps may be performed by noting memory and/or data structure locations (e.g., pointers) to data that has been, or that has not yet been, filtered out, and then generating the processed data set based on the noted memory and/or data structure locations. The filtering steps can also be generated using some combination of these methods, or another method entirely.

The filtering steps have three main stages (see step 620, step 630, and step 640). An exemplary illustration of the filtering process is depicted in FIG. 6 as the filtered data source(s) 670.

In particular, the filtering steps may filter the data based on permission settings associated with the identifier 205 (step 620). For example, if the viewer of the analytic visualization 110 is the high-ranking company executive of a company, the permission settings associated with the high-ranking company executive's identifier 205 could filter out little, if any, of the data from the data source(s) 170 (and additional data 690 if applicable), since the high-ranking company executive should be able to see any relevant data in order to best lead the company. In contrast, if the viewer of the analytic visualization 110 is a member of the public (and potentially an employee of a competitor), the permission settings associated with the public viewer's identifier 205 could filter out much, if not all, of the data from the data source(s) 170 (and additional data 690 if applicable). If the viewer of the analytic visualization 110 is a regional manager of the company, the permission settings associated with the regional manager's identifier 205 filter out any data not relevant to the regional manager's own managed region from the data source(s) 170 (and additional data 690 if applicable). In some cases, permission settings may bar certain individuals from seeing any data of an entire data category (e.g., employee evaluation reports) or any data from an entire data source (e.g., a data source storing trade secrets). Any data filtered out during filtering step 620 is then not included in the processed data set 215 when the processed data set 215 is generated in step 650.

The filtering steps may also filter the data based on the data request 200 (step 630). For example, if the data source(s) 170 (and the additional data 690 if applicable) contain worldwide sales data, but the data request 200 indicates that the viewer only wishes United States sales data in the analytic visualization 110, then any worldwide sales data not pertaining to the United States could be filtered out so as not to be included in the processed data set 215 when the processed data set 215 is generated in step 650.

The filtering steps may also filter the data based on metadata 510 (step 640). The metadata 510 may include various information describing the data in the analytic visualization 110, such as graph axes (e.g., time, money, geographic location, votes, cost, sales, or similar categories of data), the type/format of the analytic visualization 110 (e.g., line graph, bar chart, pie chart, or any of the other possible types of analytic visualization 110), information about where the data from the analytic visualization 110 is stored, or other data. Metadata 510 may be used to filter data from the data source(s) 170 (and the additional data 690 if applicable) in certain circumstances. For example, if the data source(s) 170 includes sensor measurement data taken every 5 seconds, but the metadata 510 indicates that the analytic visualization 110 is a line graph charting sensor measurement data at 10 second intervals, then half of the data could be filtered out so as not to be included in the processed data set 215 when the processed data set 215 is generated in step 650.

Once the data server(s) 145 generate the processed data set 215 (step 650), the data server(s) 145 may transmit the processed data set 215 to the update server(s) 140 to be stored in an update server memory 660 of the update server(s) 140. The update server memory 660 could also store other datasets, such as the data request 200 from the container 130, the identifier 205 from the container 130, and the metadata 510. The update server(s) 145 may then use the processed data set 215 to generate the visualization update 220 as described in FIG. 2, FIG. 4, FIG. 5A, and/or FIG. 5B.

Figure 7:
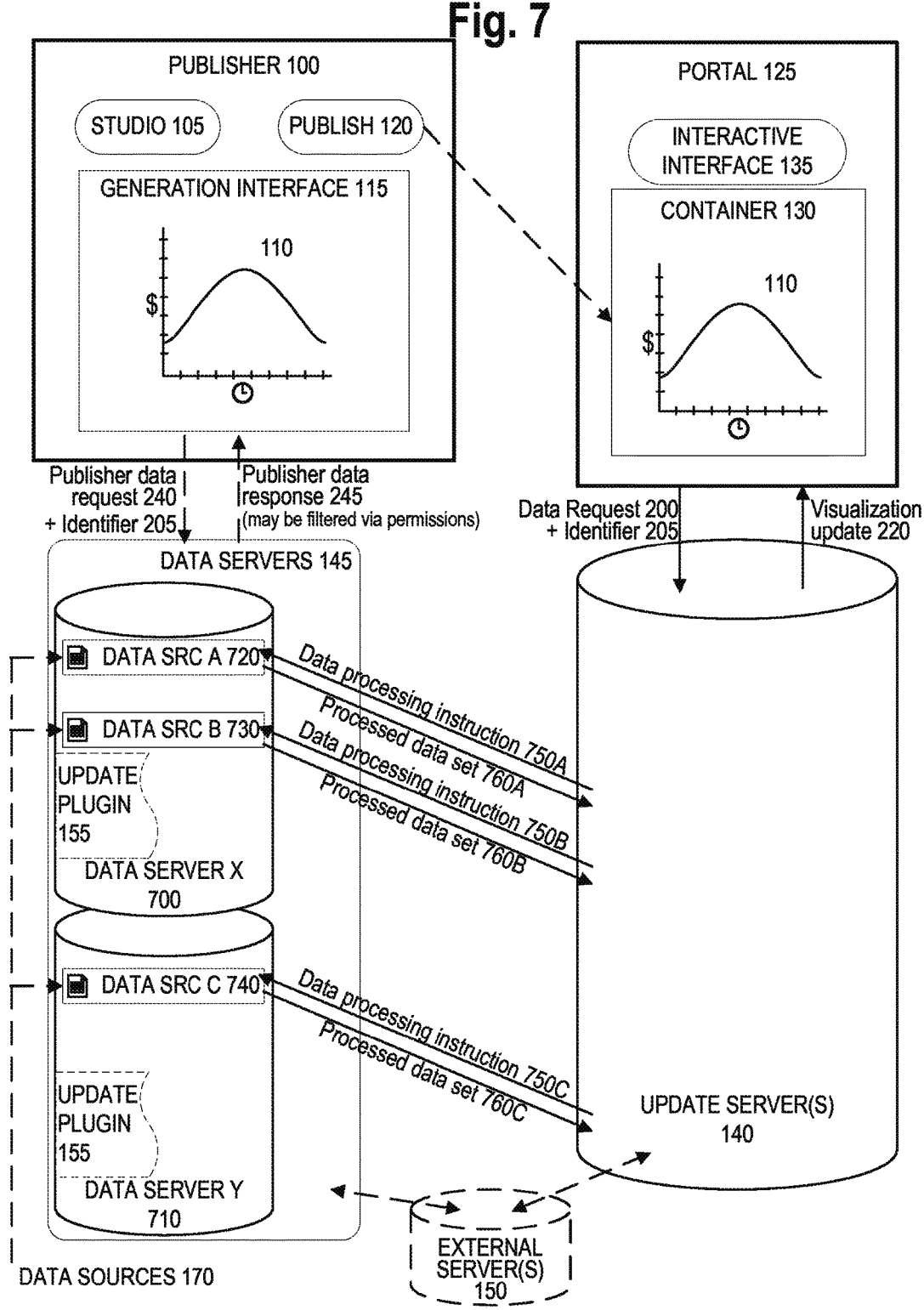
FIG. 7 illustrates an exemplary analytic visualization ecosystem with multiple data sources stored at multiple data servers.

FIG. 7 illustrates an analytic visualization ecosystem with multiple data sources stored at multiple data servers. In the ecosystem of FIG. 7, multiple data sources 170 are illustrated by data source A 720, data source B 730, and data source C 740. Multiple data servers 145 are exemplified by data server X 700 and data server Y 710.

The processes described herein regarding the data server(s) 145 and the data source(s) 170 can be applied to situations where multiple data sources are present, either on a single data server 145, on a set of multiple data servers 145, or some combination thereof. For example, the exemplary analytic visualization ecosystem of FIG. 7 illustrates the data server(s) 145 encompassing a data server X 700 with a data source A 720 and a data source B 730 as well as a data server Y 710 with a data source C 840.

While both data server X 700 and data server Y 710 are illustrated as storing a copy of the update plugin 155, in some cases, only a subset of data servers in the set of data servers 145 store a copy of the update plugin 155 (e.g., in one embodiment, the data server X 700 stores a copy of update plugin 155 while the data server Y 710 does not). In some cases, none of the data servers 145 might store the update plugin 155, but rather, the data servers 145 could be managed by another hardware device (not shown) with functionality similar to the update plugin 155, which itself may or may not store a data source of the data sources 170.

In the ecosystem of FIG. 7, the update server(s) 140 transmit one data processing instruction per data source (of the data sources 170), and receive one processed data set per data source (of the data sources 170). In particular, the update server(s) 140 transmit data processing instruction 750A to data source A 720, and the data server X 700 then transmits processed data set 760A back to the update server(s) 140. The update server(s) 140 transmit data processing instruction 750B to data source B 730, and the data server X 700 then transmits processed data set 760B back to the update server(s) 140. The update server(s) 140 transmit data processing instruction 750C to data source C 740, and the data server Y 710 then transmits processed data set 760C back to the update server(s) 140. Update server(s) 140 may then combine processed data set 760A, processed data set 760B, and processed data set 760C into a single "combined" processed data set on which to base the visualization update 220. In other embodiments (not shown), the update server(s) 140 may send one data processing instruction per data server instead of per data source, in which case all of the data sources on the receiving data server may undergo processing operations (e.g., such as the processing operations in FIG. 6) together. In still other embodiments, the update server(s) 140 may send one data processing instruction for all of the data servers 145, in which case all of the data sources 170 may undergo processing operations (e.g., such as the processing operations in FIG. 6) together.

Figure 8:
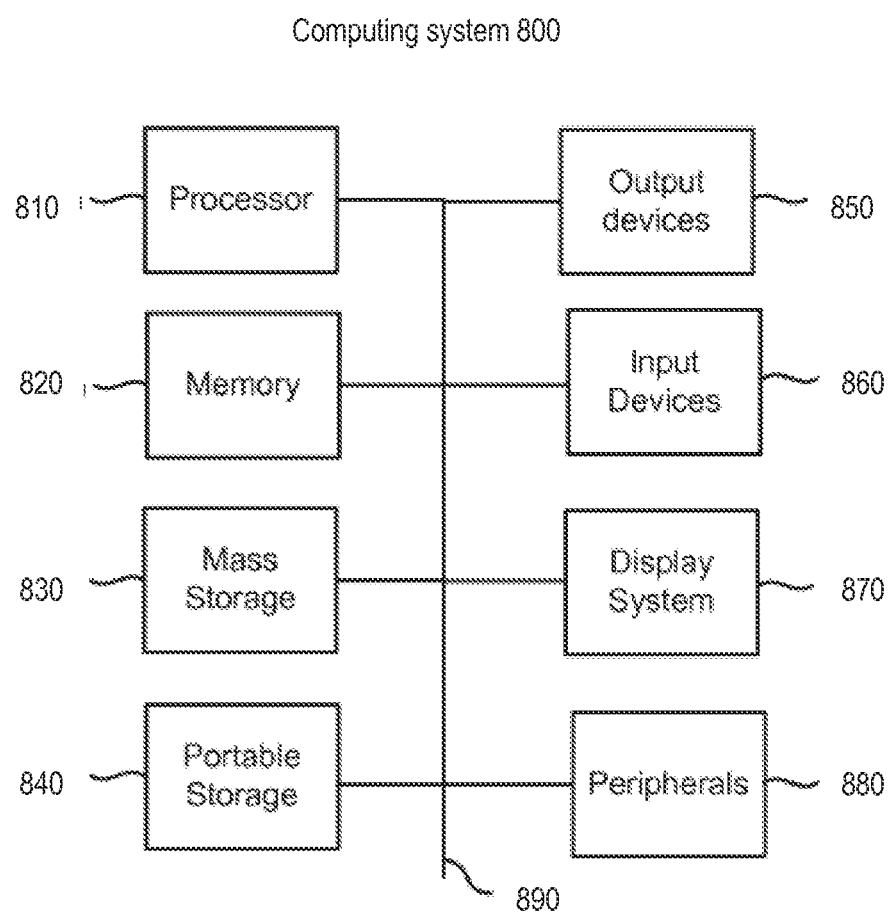
FIG. 8 is a block diagram of an exemplary computing device that may be used to implement an embodiment of the present invention.

FIG. 8 illustrates an exemplary computing system 800 that may be used to implement an embodiment of the present invention. The computing system 800 of FIG. 8 includes one or more processors 810 and memory 810. Main memory 810 stores, in part, instructions and data for execution by processor 810. Main memory 810 can store the executable code when in operation. The system 800 of FIG. 8 further includes a mass storage device 830, portable storage medium drive(s) 840, output devices 850, user input devices 860, a graphics display 870, and peripheral devices 880.

The components shown in FIG. 8 are depicted as being connected via a single bus 890. However, the components may be connected through one or more data transport means. For example, processor unit 810 and main memory 810 may be connected via a local microprocessor bus, and the mass storage device 830, peripheral device(s) 880, portable storage device 840, and display system 870 may be connected via one or more input/output (I/O) buses.

Mass storage device 830, which may be implemented with a magnetic disk drive or an optical disk drive, is a non-volatile storage device for storing data and instructions for use by processor unit 810. Mass storage device 830 can store the system software for implementing embodiments of the present invention for purposes of loading that software into main memory 810.

Portable storage device 840 operates in conjunction with a portable non-volatile storage medium, such as a floppy disk, compact disk or Digital video disc, to input and output data and code to and from the computer system 800 of FIG. 8. The system software for implementing embodiments of the present invention may be stored on such a portable medium and input to the computer system 800 via the portable storage device 840.

Input devices 860 provide a portion of a user interface. Input devices 860 may include an alpha-numeric keypad, such as a keyboard, for inputting alpha-numeric and other information, or a pointing device, such as a mouse, a trackball, stylus, or cursor direction keys. Additionally, the system 800 as shown in FIG. 8 includes output devices 850. Examples of suitable output devices include speakers, printers, network interfaces, and monitors.

Display system 870 may include a liquid crystal display (LCD) or other suitable display device. Display system 870 receives textual and graphical information, and processes the information for output to the display device.

Peripherals 880 may include any type of computer support device to add additional functionality to the computer system. For example, peripheral device(s) 880 may include a modem or a router.

The components contained in the computer system 800 of FIG. 8 are those typically found in computer systems that may be suitable for use with embodiments of the present invention and are intended to represent a broad category of such computer components that are well known in the art. Thus, the computer system 800 of FIG. 8 can be a personal computer, hand held computing device, telephone, mobile computing device, workstation, server, minicomputer, mainframe computer, or any other computing device. The computer can also include different bus configurations, networked platforms, multi-processor platforms, etc. Various operating systems can be used including Unix, Linux, Windows, Macintosh OS, Palm OS, and other suitable operating systems.

The present invention may be implemented in an application that may be operable using a variety of devices. Non-transitory computer-readable storage media refer to any medium or media that participate in providing instructions to a central processing unit (CPU) for execution. Such media can take many forms, including, but not limited to, non-volatile and volatile media such as optical or magnetic disks and dynamic memory, respectively. Common forms of non-transitory computer-readable media include, for example, a floppy disk, a flexible disk, a hard disk, magnetic tape, any other magnetic medium, a CD-ROM disk, digital video disk (DVD), any other optical medium, RAM, PROM, EPROM, a FLASHEPROM, and any other memory chip or cartridge.

Various forms of transmission media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU. Various forms of storage may likewise be implemented as well as the necessary network interfaces and network topologies to implement the same.

While various flow diagrams have been described above, it should be understood that these show a particular order of operations performed by certain embodiments of the invention, and that such order is exemplary. Alternative embodiments can perform the operations in a different order, combine certain operations, or overlap certain operations depicted in the flow diagrams.

While various embodiments have been described above, it should be understood that they have been presented by way of example only, and not limitation. The descriptions are not intended to limit the scope of the invention to the particular forms set forth herein. Thus, the breadth and scope of a preferred embodiment should not be limited by any of the above-described exemplary embodiments. It should be understood that the above description is illustrative and not restrictive. To the contrary, the present descriptions are intended to cover such alternatives, modifications, and equivalents as may be included within the spirit and scope of the invention as defined by the appended claims and otherwise appreciated by one of ordinary skill in the art. The scope of the invention should, therefore, be determined not with reference to the above description, but instead should be determined with reference to the appended claims along with their full scope of equivalents.

What is claimed is:

1. A method of securely providing analytic visualization data, comprising:
 receiving a data request from a container at an update server, wherein a viewer device displays an analytic visualization via the container;
 receiving an identifier from the viewer device at the update server;
 generating a data processing instruction at the update server based on the data request;
 transmitting the data processing instruction and the identifier from the update server to a data server storing a data source in response to receipt of the data request and the identifier at the update server, the data processing instruction requesting that the data server locally select a subset of the data source based on the data request and on a permission setting associated with the identifier;

receiving the subset of the data source from the data server at the update server without receiving any additional data from the data source that is not in the subset of the data source;

generating a visualization update at the update server based on the subset of the data source; and transmitting the visualization update from the update server to the container, thereby causing the viewer device to display an updated version of the analytic visualization via the container.

2. The method of claim 1, wherein the visualization update includes the subset of the data source and a metadata data set, and wherein the container is operable to generate the updated version of the analytic visualization using the subset of the data source and the metadata data set after receiving the visualization update from the update server.

3. The method of claim 1, wherein generating the visualization update at the update server includes generating the updated version of the analytic visualization at the update server, and wherein the visualization update includes data corresponding to the updated version of the analytic visualization.

4. The method of claim 1, wherein the identifier is one of an OAuth token, a browser cookie, a symmetric key, a public key, a temporary security token, a certificate signed by a certificate authority, a Lightweight Directory Access Protocol (LDAP) token, a Remote Authentication Dial In User Service (RADIUS) token, a Security Assertion Markup Language (SAML) token, an Active Directory token, an Extensible Markup Language (XML) based token, or a data set including at least one user-specific descriptor.

5. The method of claim 1, wherein the identifier includes at least one of a name, a username, a user account, a telephone number, an email address, a password, a PIN number, a social security number, a driver's license number, an identification number, a biometric dataset, a user-specific code, a user-specific barcode, a user-specific icon, an image, or an identifying user trait.

6. The method of claim 1, wherein the permission setting is stored alongside the identifier, is received from the container alongside the identifier, and is transmitted to the data server alongside the identifier.

7. The method of claim 1, wherein the permission setting is stored separately from the identifier but is accessible to the data server via a security server.

8. The method of claim 1, wherein at least part of the data source is stored at an external data server that is communicatively coupled to the data server.

9. The method of claim 1, wherein the container is embedded in a portal, and wherein the portal is a network entity accessible through the public Internet.

10. The method of claim 1, wherein the container is embedded in a portal, and wherein the portal is a private network entity such that access to the portal is limited to a predetermined one or more individuals.

11. A system for securely providing analytic visualization data, comprising:

a data server plugin within a data server memory of a data server; and an update server communicatively coupled to the data server and to a viewer device, the update server having an update server memory and an update server processor, wherein execution of instructions stored in the update server memory by the update server processor causes the update server to:

receive a data request from a container, wherein the viewer device displays an analytic visualization via the container, receive an identifier from the viewer device, generate a data processing instruction based on the data request;

transmit the data processing instruction and the identifier to a data server storing a data source in response to receipt of the data request and the identifier, the data processing instruction requesting that the data server locally select a subset of the data source based on the data request and on a permission setting associated with the identifier, receive the subset of the data source from the data server without receiving any additional data from the data source that is not in the subset of the data source, generate a visualization update based on the subset of the data source; and transmit the visualization update to the container, thereby causing the viewer device to display an updated version of the analytic visualization via the container.

12. The system of claim 11, wherein the visualization update includes the subset of the data source and a metadata data set, and wherein the container is operable to generate the updated version of the analytic visualization using the subset of the data source and the metadata data set after receiving the visualization update from the update server.

13. The system of claim 11, wherein generating the visualization update includes generating the updated version of the analytic visualization, and wherein the visualization update includes data corresponding to the updated version of the analytic visualization.

14. The system of claim 11, wherein the identifier includes at least one of a name, a username, a user account, a telephone number, an email address, a password, a PIN number, a social security number, a driver's license number, an identification number, a biometric dataset, a user-specific code, a user-specific barcode, a user-specific icon, an image, or an identifying user trait.

15. The system of claim 11, wherein the permission setting is stored alongside the identifier, is received by the update server from the container alongside the identifier, and is transmitted to the data server from the update server alongside the identifier.

16. The system of claim 11, wherein the permission setting is stored separately from the identifier but is accessible to the data server from a security server.

17. The system of claim 11, wherein at least part of the data source is stored at an external data server that is communicatively coupled to at least one of the data server or the update server.

18. The system of claim 11, wherein the container is embedded in a portal, and wherein the portal is a public Internet entity.

19. The system of claim 11, wherein the container is embedded in a portal, and wherein the portal is a private network entity such that access to the portal is limited to a predetermined one or more individuals.

20. A non-transitory computer-readable storage medium, having embodied thereon a program executable by a processor to perform a method for providing analytic visualization data, the method comprising:

receiving a data request from a container, wherein a viewer device displays an analytic visualization via the container;

receiving an identifier from the viewer device;

generating a data processing instruction based on the data request;
transmitting the data processing instruction and the identifier to a data server storing a data source in response to receipt of the data request and the identifier, the data processing instruction requesting that the data server locally select a subset of the data source based on the data request and on a permission setting associated with the identifier;
receiving the subset of the data source from the data server without receiving any additional data from the data source that is not in the subset of the data source;
generating a visualization update based on the subset of the data source; and
transmitting the visualization update to the container, thereby causing the viewer device to display an updated version of the analytic visualization via the container.

* * * * *